(12) United States Patent
Kotak

(10) Patent No.: US 10,742,806 B2
(45) Date of Patent: Aug. 11, 2020

(54) METHOD, SYSTEM AND BOT ARCHITECTURE FOR AUTOMATICALLY SENDING A USER CONTENT, THAT IS RESPONSIVE TO USER MESSAGES FROM THAT USER, TO SOLICIT ADDITIONAL INFORMATION FROM THAT USER

(71) Applicant: salesforce.com, inc., San Francisco, CA (US)

(72) Inventor: Jigar Sharad Kotak, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 198 days.

(21) Appl. No.: 15/974,526

(22) Filed: May 8, 2018

(65) Prior Publication Data
US 2019/0349477 A1    Nov. 14, 2019

(51) Int. Cl.
| | | |
|---|---|---|
| *H04M 3/00* | (2006.01) | |
| *H04M 3/487* | (2006.01) | |
| *H04M 3/493* | (2006.01) | |
| *G06Q 30/02* | (2012.01) | |
| *H04M 3/42* | (2006.01) | |
| *G06N 20/00* | (2019.01) | |
| *G06F 16/903* | (2019.01) | |
| *G06F 40/40* | (2020.01) | |

(52) U.S. Cl.
CPC .......... *H04M 3/4878* (2013.01); *G06N 20/00* (2019.01); *G06Q 30/0251* (2013.01); *H04M 3/42221* (2013.01); *H04M 3/4938* (2013.01); *G06F 16/90335* (2019.01); *G06F 40/40* (2020.01)

(58) Field of Classification Search
CPC .... G06Q 30/02; H04M 3/5175; H04M 3/523; H04M 3/5183
USPC ..................................... 705/7.14; 379/265.02
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |

(Continued)

*Primary Examiner* — Rasha S Al Aubaidi
(74) *Attorney, Agent, or Firm* — LKGlobal | Lorenz & Kopf, LLP

(57) ABSTRACT

A bot engine, an application platform, and a content distribution server (CDS) are provided. When a user sends a user message (UM), the bot engine processes the content of the UM to generate one or more of a record insert or a query, and passes it to the application platform, which generates a user update message (UUM) based on the record insert or the query. In response to the UUM, the CDS can send the user additional content that is responsive to the original UM to solicit additional information from that user. For example, the CDS can generate a response message that includes content that is responsive to the content of the UM, and in response to the response message, the user can then send the CDS a user reply message (URM) that includes content pertaining to the user that is responsive to the content of the response message.

20 Claims, 9 Drawing Sheets

(56) References Cited

U.S. PATENT DOCUMENTS

| | | |
|---|---|---|
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0247051 A1 | 10/2011 | Bulumulla et al. |
| 2012/0042218 A1 | 2/2012 | Cinarkaya et al. |
| 2012/0084112 A1* | 4/2012 | Bagchi ............... G06Q 10/06 |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2017/0024098 A1* | 1/2017 | Doherty ............... G06F 3/0485 |
| 2019/0215283 A1* | 7/2019 | Nahum ............... H04L 51/02 |

* cited by examiner

METHOD, SYSTEM AND BOT ARCHITECTURE FOR AUTOMATICALLY SENDING A USER CONTENT, THAT IS RESPONSIVE TO USER MESSAGES FROM THAT USER, TO SOLICIT ADDITIONAL INFORMATION FROM THAT USER

TECHNICAL FIELD

Embodiments of the subject matter described herein relate generally to customer relationship management applications. More particularly, embodiments of the subject matter relate to a method, system and bot architecture for automatically sending a user content, responsive to a user message from that user, to solicit additional information from that user. For example, in one non-limiting embodiment, the disclosed embodiments can be used to provide targeted marketing information to a user (e.g., consumer, potential customer or existing customer) and to solicit additional information from that user, for example, as part of a transaction with that user).

BACKGROUND

Today many enterprises now use cloud-based computing platforms that allow services and data to be accessed over the Internet (or via other networks). Infrastructure providers of these cloud-based computing platforms offer network-based processing systems that often support multiple enterprises (or tenants) using common computer hardware and data storage. This "cloud" computing model allows applications to be provided over a platform "as a service" supplied by the infrastructure provider. The infrastructure provider typically abstracts the underlying hardware and other resources used to deliver a customer-developed application so that the customer no longer needs to operate and support dedicated server hardware. The cloud computing model can often provide substantial cost savings to the customer over the life of the application because the customer no longer needs to provide dedicated network infrastructure, electrical and temperature controls, physical security and other logistics in support of dedicated server hardware.

One type of cloud-based application is a customer relationship management (CRM) application that can provide an end user with sophisticated customer relationship data. Records for each customer can be stored at a server system. The end user can launch the CRM application and submit requests to the server system over a network to access records that are relevant to a particular customer. The server system fetches the relevant records, which can then be presented to the end user to provide the end user with a wealth of information about that particular customer.

Traditional sales and service channels such as phone, email and chat allow agents to send notification, communication and marketing content to consumers, prospective customers or existing customers manually. More recently, automated marketing systems have been deployed that rely on bots (e.g., Chatbots). Companies often use bots to cut down on cost, instead of employing people to communicate with consumers and answer customer's questions.

A bot is an automated program (or software application) that runs automated tasks (scripts) over the Internet and operates as an agent for a user or another program or simulates a human activity. Typically, bots perform tasks that are both simple and structurally repetitive, at a much higher rate than would be possible for a human alone. For example, bot (also referred to as a web crawler) may lurk in the background of a conversation channel, and automatically interact and communicate with users (e.g., potential or existing customers) to answer many common questions that are regularly asked. In other words, a bot can allow a user to ask questions in plain language, and can then formulate a response (e.g., based on pattern matching) and reply to messages that have been received from the user via instant messaging (IM), instant relay chat, Internet Relay Chat (IRC), or other assorted web interfaces (e.g., Facebook Bots and Twitterbots). Some bots can also help gather information from the users that it communicates with and store this information in a database for marketing purposes.

While this approach works well for frequently occurring questions that are commonly asked, due to the highly transactional nature of many conversations, it can be difficult, if not impossible, to design a bot that can provide different customers with content that is curated and targeted for each particular customer. It would be desirable to provide systems that can rely on bots to automatically answer frequently occurring questions that are commonly asked, but also provide different customers with targeted content that is addressed for each particular customer.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
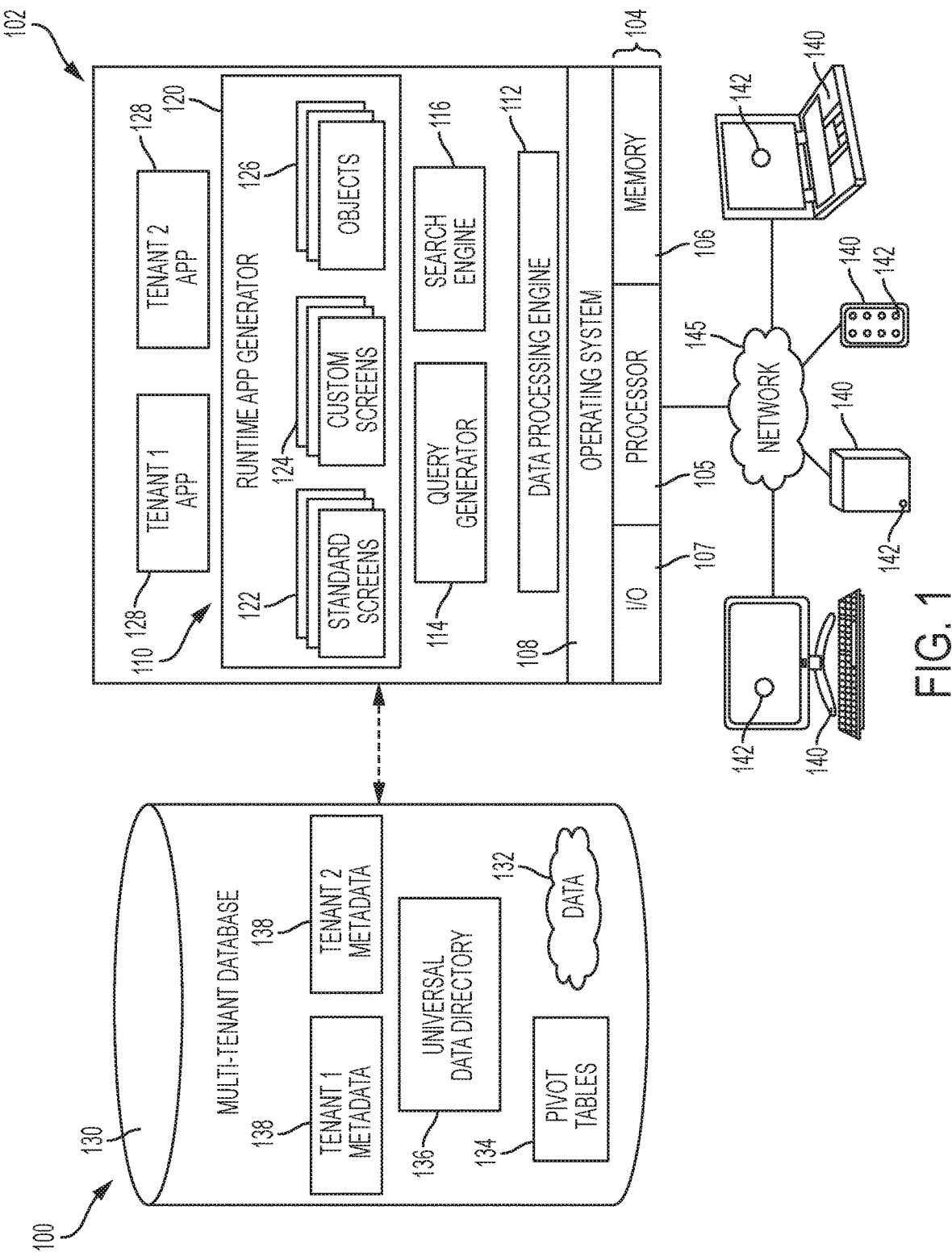
FIG. 1 is a schematic block diagram of an example of a multi-tenant computing environment in which features of the disclosed embodiments can be implemented in accordance with some of the disclosed embodiments.

A method, system and bot architecture are provided for automatically sending a user (e.g., a consumer, a prospective customer, an existing customer, etc.) content that is responsive to a user message from that user to solicit additional information from that user (e.g., as part of a transaction with the user). The system includes a bot engine, a server system that includes an application platform configurable to host and execute a CRM application, and a marketing server system that includes a content distribution server.

When an interaction platform (that can be external to the system or part of the system) receives a user message from a user, that is communicated from a user system of that user, the interaction platform can send the user message to the bot engine as a user message object. The user message object includes content of the user message.

The bot engine can process the user message object to generate one or more of a record insert or a query based on the user message object, and pass it to the application platform, which generates a user update message based on the record insert or the query.

In response to the user update message, the content distribution server can send the user additional content that is responsive to the original user message from that user in an attempt to solicit additional information from that user. For example, the content distribution server can generate a response message that includes content that is responsive to the content of the user message from the user message object (e.g., content responsive to something in the user message). For instance, as one example, the response message can include targeted marketing information that is responsive to the content of the user message.

In response to the response message, the user can then send a user reply message to the content distribution server. The user reply message includes content, pertaining to the user, that is responsive to the content of the response message (i.e., that was sent from the content distribution server). For instance, as one non-limiting example, a user reply message can include information about or associated with that user.

This system allows the bot engine to automatically to carry on a conversation with the user by automatically replying to and answering high-volume, frequently occurring questions that are commonly asked by many different users that contact the system. In some cases, the bot engine is not designed to provide highly targeted content that is specific to a particular user, or it may be necessary to conduct additional follow-up that is outside the capabilities of the bot engine. In addition, the bot engine only interacts with the user while a session is active. To address these issues, the system includes the marketing server system that is that is integrated with a CRM system and CRM database. The marketing server system can use personalized data for the user that is stored at a CRM database to provide content to the user that is targeted for that particular user. The marketing server system can provide the user with more personalized attention by providing targeted content to that particular user (e.g., content that is addressed to that particular user in cases where more targeted content is desirable or required), and while also allowing a marketing entity to collect additional information from that particular user in an efficient manner. The marketing server system can do all of this regardless of whether or not the user is engaged in an active session. The integration of the bot engine, CRM system, and marketing server system together provides an automated marketing system that can automatically provide each customer with a higher level of curated and targeted content and other notifications and communications.

Prior to describing the disclosed embodiments in detail, a description of a customer relationship management (CRM) system that can be implemented within a multi-tenant computing environment will be provided to describe aspects of a CRM system that can be used in conjunction with the disclosed embodiments.

FIG. 1 is a schematic block diagram of an example of a multi-tenant computing environment in which features of the disclosed embodiments can be implemented in accordance with the disclosed embodiments. As shown in FIG. 1, an exemplary cloud-based solution may be implemented in the context of a multi-tenant system 100 including a server 102 (or server system 102) that supports applications 128 based upon data 132 from a database 130 that may be shared between multiple tenants, organizations, or enterprises, referred to herein as a multi-tenant database. The multi-tenant system 100 can be shared by many different organizations, and handles the storage of, and access to, different metadata, objects, data and applications across disparate organizations. In one embodiment, the multi-tenant system 100 can be part of a database system, such as a multi-tenant database system.

The multi-tenant system 100 can provide applications and services and store data for any number of organizations. Each organization is a source of metadata and data associated with that metadata that collectively make up an application. In one implementation, the metadata can include customized content of the organization (e.g., customizations done to an instance that define business logic and processes for an organization). Some non-limiting examples of metadata can include, for example, customized content that describes a build and functionality of objects (or tables), tabs, fields (or columns), permissions, classes, pages (e.g., Apex pages), triggers, controllers, sites, communities, workflow rules, automation rules and processes, etc. Data is associated with metadata to create an application. Data can be stored as one or more objects, where each object holds particular records for an organization. As such, data can include records (or user content) that are held by one or more objects.

The multi-tenant system 100 allows users of user systems 140 to establish a communicative connection to the multi-tenant system 100 over a network 145 such as the Internet or any type of network described herein. Based on a user's interaction with a user system 140, the application platform 110 accesses an organization's data (e.g., records held by an object) and metadata that is stored at one or more database systems 130 and provides the user system 140 with access to applications based on that data and metadata. These applications are executed or run in a process space of the application platform 110 will be described in greater detail below. The user system 140 and various other user systems (not illustrated) can interact with the applications provided by the multi-tenant system 100. The multi-tenant system 100 is configured to handle requests for any user associated with any organization that is a tenant of the system. Data and services generated by the various applications 128 are provided via a network 145 to any number of user systems 140, such as desktops, laptops, tablets, smartphones or other client devices, Google Glass™, and any other computing device implemented in an automobile, aircraft, television, or other business or consumer electronic device or system, including web clients.

Each application 128 is suitably generated at run-time (or on-demand) using a common application platform 110 that securely provides access to the data 132 in the database 130 for each of the various tenant organizations subscribing to the system 100. The application platform 110 has access to one or more database systems 130 that store information (e.g., data and metadata) for a number of different organizations including user information, organization information, custom information, etc. The database systems 130 can include a multi-tenant database system 130 as described with reference to FIG. 1, as well as other databases or sources of information that are external to the multi-tenant database system 130 of FIG. 1. In accordance with one non-limiting example, the service cloud 100 is implemented in the form of an on-demand multi-tenant customer relationship management (CRM) system that can support any number of authenticated users for a plurality of tenants.

As used herein, a "tenant" or an "organization" should be understood as referring to a group of one or more users (typically employees) that share access to common subset of the data within the multi-tenant database 130. In this regard, each tenant includes one or more users and/or groups associated with, authorized by, or otherwise belonging to that respective tenant. Stated another way, each respective user within the multi-tenant system 100 is associated with, assigned to, or otherwise belongs to a particular one of the plurality of enterprises supported by the system 100.

Each enterprise tenant may represent a company, corporate department, business or legal organization, and/or any other entities that maintain data for particular sets of users (such as their respective employees or customers) within the multi-tenant system 100. Although multiple tenants may share access to the server 102 and the database 130, the particular data and services provided from the server 102 to each tenant can be securely isolated from those provided to other tenants. The multi-tenant architecture therefore allows different sets of users to share functionality and hardware resources without necessarily sharing any of the data 132 belonging to or otherwise associated with other organizations.

The multi-tenant database 130 may be a repository or other data storage system capable of storing and managing the data 132 associated with any number of tenant organizations. The database 130 may be implemented using conventional database server hardware. In various embodiments, the database 130 shares processing hardware 104 with the server 102. In other embodiments, the database 130 is implemented using separate physical and/or virtual database server hardware that communicates with the server 102 to perform the various functions described herein.

In an exemplary embodiment, the database 130 includes a database management system or other equivalent software capable of determining an optimal query plan for retrieving and providing a particular subset of the data 132 to an instance of application (or virtual application) 128 in response to a query initiated or otherwise provided by an application 128, as described in greater detail below. The multi-tenant database 130 may alternatively be referred to herein as an on-demand database, in that the database 130 provides (or is available to provide) data at run-time to on-demand virtual applications 128 generated by the application platform 110, as described in greater detail below.

In practice, the data 132 may be organized and formatted in any manner to support the application platform 110. In various embodiments, the data 132 is suitably organized into a relatively small number of large data tables to maintain a semi-amorphous "heap"-type format. The data 132 can then be organized as needed for a particular virtual application 128. In various embodiments, conventional data relationships are established using any number of pivot tables 134 that establish indexing, uniqueness, relationships between entities, and/or other aspects of conventional database organization as desired. Further data manipulation and report formatting is generally performed at run-time using a variety of metadata constructs. Metadata within a universal data directory (UDD) 136, for example, can be used to describe any number of forms, reports, workflows, user access privileges, business logic and other constructs that are common to multiple tenants.

Tenant-specific formatting, functions and other constructs may be maintained as tenant-specific metadata 138 for each tenant, as desired. Rather than forcing the data 132 into an inflexible global structure that is common to all tenants and applications, the database 130 is organized to be relatively amorphous, with the pivot tables 134 and the metadata 138 providing additional structure on an as-needed basis. To that end, the application platform 110 suitably uses the pivot tables 134 and/or the metadata 138 to generate "virtual" components of the virtual applications 128 to logically obtain, process, and present the relatively amorphous data 132 from the database 130.

The server 102 may be implemented using one or more actual and/or virtual computing systems that collectively provide the dynamic application platform 110 for generating the virtual applications 128. For example, the server 102 may be implemented using a cluster of actual and/or virtual servers operating in conjunction with each other, typically in association with conventional network communications, cluster management, load balancing and other features as appropriate. The server 102 operates with any sort of conventional processing hardware 104, such as a processor 105, memory 106, input/output features 107 and the like. The input/output features 107 generally represent the interface(s) to networks (e.g., to the network 145, or any other local area, wide area or other network), mass storage, display devices, data entry devices and/or the like.

The processor 105 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 106 represents any non-transitory short or long-term storage or other computer-readable media capable of storing programming instructions for execution on the processor 105, including any sort of random access memory (RAM), read only memory (ROM), flash memory, magnetic or optical mass storage, and/or the like. The computer-executable programming instructions, when read and executed by the server 102 and/or processor 105, cause the server 102 and/or processor 105 to create, generate, or otherwise facilitate the application platform 110 and/or virtual applications 128 and perform one or more additional tasks, operations, functions, and/or processes described herein. It should be noted that the memory 106 represents one suitable implementation of such computer-readable media, and alternatively or additionally, the server 102 could receive and cooperate with external computer-readable media that is realized as a portable or mobile component or platform, e.g., a portable hard drive, a USB flash drive, an optical disc, or the like.

The server 102, application platform 110 and database systems 130 can be part of one backend system. Although not illustrated, the multi-tenant system 100 can include other backend systems that can include one or more servers that work in conjunction with one or more databases and/or data processing components, and the application platform 110 can access the other backend systems.

The multi-tenant system 100 includes one or more user systems 140 that can access various applications provided by the application platform 110. The application platform 110 is a cloud-based user interface. The application platform 110 can be any sort of software application or other data processing engine that generates the virtual applications 128 that provide data and/or services to the user systems 140. In a typical embodiment, the application platform 110 gains access to processing resources, communications interfaces and other features of the processing hardware 104 using any sort of conventional or proprietary operating system 108. The virtual applications 128 are typically generated at run-time in response to input received from the user systems 140. For the illustrated embodiment, the application platform 110 includes a bulk data processing engine 112, a query generator 114, a search engine 116 that provides text indexing and other search functionality, and a runtime application generator 120. Each of these features may be implemented as a separate process or other module, and many equivalent embodiments could include different and/or additional features, components or other modules as desired.

The runtime application generator 120 dynamically builds and executes the virtual applications 128 in response to specific requests received from the user systems 140. The virtual applications 128 are typically constructed in accordance with the tenant-specific metadata 138, which describes the particular tables, reports, interfaces and/or other features of the particular application 128. In various embodiments, each virtual application 128 generates dynamic web content that can be served to a browser or other client program 142 associated with its user system 140, as appropriate.

The runtime application generator 120 suitably interacts with the query generator 114 to efficiently obtain multi-tenant data 132 from the database 130 as needed in response to input queries initiated or otherwise provided by users of the user systems 140. In a typical embodiment, the query generator 114 considers the identity of the user requesting a particular function (along with the user's associated tenant), and then builds and executes queries to the database 130 using system-wide metadata 136, tenant specific metadata 138, pivot tables 134, and/or any other available resources. The query generator 114 in this example therefore maintains security of the common database 130 by ensuring that queries are consistent with access privileges granted to the user and/or tenant that initiated the request.

With continued reference to FIG. 1, the data processing engine 112 performs bulk processing operations on the data 132 such as uploads or downloads, updates, online transaction processing, and/or the like. In many embodiments, less urgent bulk processing of the data 132 can be scheduled to occur as processing resources become available, thereby giving priority to more urgent data processing by the query generator 114, the search engine 116, the virtual applications 128, etc.

In exemplary embodiments, the application platform 110 is utilized to create and/or generate data-driven virtual applications 128 for the tenants that they support. Such virtual applications 128 may make use of interface features such as custom (or tenant-specific) screens 124, standard (or universal) screens 122 or the like. Any number of custom and/or standard objects 126 may also be available for integration into tenant-developed virtual applications 128. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system.

The data 132 associated with each virtual application 128 is provided to the database 130, as appropriate, and stored until it is requested or is otherwise needed, along with the metadata 138 that describes the particular features (e.g., reports, tables, functions, objects, fields, formulas, code, etc.) of that particular virtual application 128. For example, a virtual application 128 may include a number of objects 126 accessible to a tenant, wherein for each object 126 accessible to the tenant, information pertaining to its object type along with values for various fields associated with that respective object type are maintained as metadata 138 in the database 130. In this regard, the object type defines the structure (e.g., the formatting, functions and other constructs) of each respective object 126 and the various fields associated therewith.

Still referring to FIG. 1, the data and services provided by the server 102 can be retrieved using any sort of personal computer, mobile telephone, tablet or other network-enabled user system 140 on the network 145. In an exemplary embodiment, the user system 140 includes a display device, such as a monitor, screen, or another conventional electronic display capable of graphically presenting data and/or information retrieved from the multi-tenant database 130, as described in greater detail below.

Typically, the user operates a conventional browser application or other client program 142 executed by the user system 140 to contact the server 102 via the network 145 using a networking protocol, such as the hypertext transport protocol (HTTP) or the like. The user typically authenticates his or her identity to the server 102 to obtain a session identifier ("SessionID") that identifies the user in subsequent communications with the server 102. When the identified user requests access to a virtual application 128, the runtime application generator 120 suitably creates the application at run time based upon the metadata 138, as appropriate. However, if a user chooses to manually upload an updated file (through either the web-based user interface or through an API), it will also be shared automatically with all of the users/devices that are designated for sharing.

As noted above, the virtual application 128 may contain Java, ActiveX, or other content that can be presented using conventional client software running on the user system 140; other embodiments may simply provide dynamic web or other content that can be presented and viewed by the user, as desired. As described in greater detail below, the query generator 114 suitably obtains the requested subsets of data 132 from the database 130 as needed to populate the tables, reports or other features of the particular virtual application 128.

The server system 102 communicates with user systems 140. The server system 102 includes an application, or application platform that serves applications 128 to user systems.

Although FIG. 1 illustrates the application being implemented using a cloud-based application or cloud-based application platform, it can also be implemented using any web application, or any client-server application. The application can access data (e.g., records) from an address space of a process. In general, the application can be hosted at the same system as the server system or at a different system than the server system. Depending on the implementation, data can be stored at storage that can be, for example, remote storage (e.g., cloud-based storage) or local storage (e.g., a database of a server system). In some implementations, the insights application can be implemented using cloud-based application platforms, such as, the Salesforce mobile application, Lightning applications (SFX), or any variants thereof. For example, in one embodiment, the application 128 can be a mobile application served by an application platform, such as Salesforce mobile application and used by mobile devices running the Salesforce mobile app.

Objects and Records

In one embodiment, the multi-tenant database system 130 can store data in the form of records and customizations. As used herein, the term "record" can refer to a particular occurrence or instance of a data object that is created by a user or administrator of a database service and stored in a database system, for example, about a particular (actual or potential) business relationship or project. The data object can have a data structure defined by the database service (a standard object) or defined by a subscriber (custom object).

An object can refer to a structure used to store data and associated metadata along with a globally unique identifier (called an identity field) that allows for retrieval of the object. In one embodiment implementing a multi-tenant database, all of the records for the tenants have an identifier stored in a common table. Each object comprises a number of fields. A record has data fields that are defined by the structure of the object (e.g. fields of certain data types and purposes). An object is analogous to a database table, fields of an object are analogous to columns of the database table, and a record is analogous to a row in a database table. Data is stored as records of the object, which correspond to rows in a database. The terms "object" and "entity" are used interchangeably herein. Objects not only provide structure for storing data, but can also power the interface elements that allow users to interact with the data, such as tabs, the layout of fields on a page, and lists of related records. Objects can also have built-in support for features such as access management, validation, formulas, triggers, labels, notes and attachments, a track field history feature, security features, etc. Attributes of an object are described with metadata, making it easy to create and modify records either through a visual interface or programmatically.

A record can also have custom fields defined by a user. A field can be another record or include links thereto, thereby providing a parent-child relationship between the records. Customizations can include custom objects and fields, Apex Code, Visualforce, Workflow, etc.

Examples of objects include standard objects, custom objects, and external objects. A standard object can have a pre-defined data structure that is defined or specified by a database service or cloud computing platform. A standard object can be thought of as a default object. For example, in one embodiment, a standard object includes one or more pre-defined fields that are common for each organization that utilizes the cloud computing platform or database system or service.

A few non-limiting examples of different types of standard objects can include sales objects (e.g., accounts, contacts, opportunities, leads, campaigns, and other related objects); task and event objects (e.g., tasks and events and their related objects); support objects (e.g., cases and solutions and their related objects); salesforce knowledge objects (e.g., view and vote statistics, article versions, and other related objects); document, note, attachment objects and their related objects; user, sharing, and permission objects (e.g., users, profiles, and roles); profile and permission objects (e.g., users, profiles, permission sets, and related permission objects); record type objects (e.g., record types and business processes and their related objects); product and schedule objects (e.g., opportunities, products, and schedules); sharing and team selling objects (e.g., account teams, opportunity teams, and sharing objects); customizable forecasting objects (e.g., includes forecasts and related objects); forecasts objects (e.g., includes objects for collaborative forecasts); territory management (e.g., territories and related objects associated with territory management); process objects (e.g., approval processes and related objects); content objects (e.g., content and libraries and their related objects); chatter feed objects (e.g., objects related to feeds); badge and reward objects; feedback and performance cycle objects, etc. For example, a record can be for a business partner or potential business partner (e.g. a client, vendor, distributor, etc.) of the user, and can include an entire company, subsidiaries, or contacts at the company. As another example, a record can be a project that the user is working on, such as an opportunity (e.g. a possible sale) with an existing partner, or a project that the user is working on.

By contrast, a custom object can have a data structure that is defined, at least in part, by an organization or by a user/subscriber/admin of an organization. For example, a custom object can be an object that is custom defined by a user/subscriber/administrator of an organization, and includes one or more custom fields defined by the user or the particular organization for that custom object. Custom objects are custom database tables that allow an organization to store information unique to their organization. Custom objects can extend the functionality that standard objects provide.

In one embodiment, an object can be a relationship management entity having a record type defined within platform that includes a customer relationship management (CRM) database system for managing a company's relationships and interactions with their customers and potential customers. Examples of CRM entities can include, but are not limited to, an account, a case, an opportunity, a lead, a project, a contact, an order, a pricebook, a product, a solution, a report, a forecast, a user, etc. For instance, an opportunity can correspond to a sales prospect, marketing project, or other business-related activity with respect to which a user desires to collaborate with others.

External objects are objects that an organization creates that map to data stored outside the organization. External objects are like custom objects, but external object record data is stored outside the organization. For example, data that's stored on premises in an enterprise resource planning (ERP) system can be accessed as external objects in real time via web service callouts, instead of copying the data into the organization.

Figure 2:
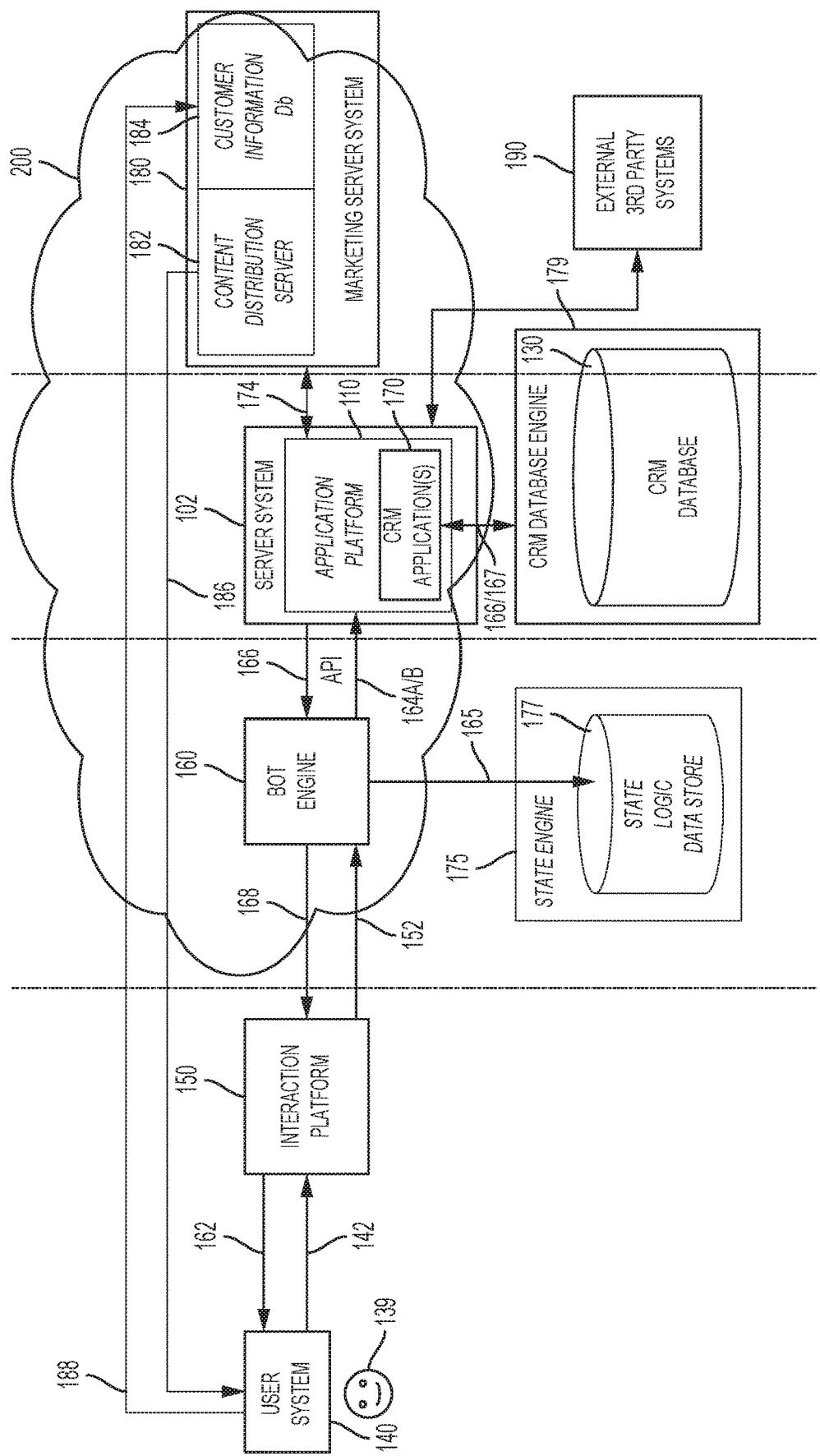
FIG. 2 is a block diagram of an automated marketing system for automatically sending a user content, responsive to a user message from that user, to solicit additional information from that user in accordance with the disclosed embodiments.

FIG. 2 is a block diagram of an automated marketing system 200 for automatically sending a user content that is responsive to a user message 142 from that user 139 to solicit additional information from that user 139 in accordance with the disclosed embodiments. For example, in one implementation, the system 200 can be used to provide targeted marketing information to a user 139 (e.g., consumers, prospective customers, existing customers, etc.) and to solicit additional information from the user 139. FIG. 2 also illustrates a user system 140 that is configured to communicate with the automated marketing system 200 over an interaction platform 150, and with a marketing server system 180 of the automated marketing system 200 via a messaging service (e.g., email, SMS, social media messengers). The disclosed embodiments can allow a transactional system to be implemented using a bot engine 160 that conducts an intelligent conversation with a user 139, while also providing a marketing server system 180 that is integrated with a CRM system 102, 179 to provide targeted information to the user 139. The automated marketing system 200 can provide consumers, prospective customers or existing customers with the same or similar experience as traditional sales and service channels including providing each customer with a higher level of curated and targeted content. As such, the automated marketing system 200 more closely resembles traditional sales and service channels, such as phone, email and chat, that allow agents to send notification, communication and marketing content manually even though the automated marketing system 200 relies on a bot engine 160 to automatically reply to and answer many common questions asked by a user 139.

The user system 140 can be any type of computer that is capable of communicating information including those described above with reference to FIG. 1. For example, the user system 140 can be a desktop or laptop computer, a tablet, a smartphone, a wearable computer, a kiosk computer, a home automation computer, a smart speaker, etc. The user system 140 can communicate messages (referred to herein as user messages 142) over the interaction platform 150. The user messages 142 can be in the form of one or more of alphanumeric text, voice, images (including video images), symbols such as emojis, etc.

The interaction platform 150 can vary depending on the implementation. In general, the interaction platform can be any web asset where an entity such as a business can have presence to represent their brand. The interaction platform 150 can be any type of communication channel or platform such as a messaging platform or interface, a web Browser or web page, a mobile browser or mobile application, a social media platform, a virtual assistant, etc. For example, in some embodiments, the interaction platform 150 can be a social platform such as a web-based social media platform or service (e.g., a social media website or service with social media network functionality). In other embodiments, the interaction platform 150 can be a software agent such as a virtual assistant that can perform tasks or services for an individual.

In general, social media refers to are computer-mediated technologies that facilitate the creation and sharing of information, ideas, career interests and other forms of expression via virtual communities and networks. Users typically access social media services via web-based technologies on desktop computers, laptop computers, or tablet computers, or download services that offer social media functionality to their mobile devices (e.g., smartphones and tablet computers). When engaging with these services, users can create highly interactive platforms through which individuals, communities, and organizations can share, co-create, discuss, and modify user-generated content or pre-made content posted online. Social media outlets operate in a dialogic transmission system (many sources to many receivers). This is in contrast to traditional media which operates under a monologic transmission model (one source to many receivers). A variety of stand-alone and built-in social media services are currently available. Examples of social media platforms include social networking websites and applications to communicate informally with others, find people, and share similar interests (e.g., Facebook), micro-blogging sites used to post very short entries or updates on a social networking site (e.g., Twitter), publishing tools and blogs (e.g., WordPress, Blogger, Squarespace), etc.

A virtual assistant, also called an artificial intelligence (AI) assistant or digital assistant, is an application program that understands natural language voice commands and completes tasks for the user. For example, a virtual assistant can use natural language processing (NLP) to match user text or voice input to executable commands. Many virtual assistants continually learn using artificial intelligence techniques including machine learning. Some non-limiting examples of virtual assistants include Apple's Siri, Google Assistant, Amazon Alexa, and Microsoft Cortana. Virtual assistants may work process different types of input including text (e.g., an instant messaging app or other app), voice (e.g., Amazon Alexa on the Amazon Echo device, or Siri on an iPhone), images (e.g., Samsung Bixby on the Samsung Galaxy S8). Some virtual assistants are accessible via multiple methods, such as Google Assistant via chat on the Google Allo app and via voice on Google Home smart speakers. Virtual assistants may be integrated into many types of platforms or across several of them. For example, virtual assistants may be integrated into devices like smart speakers (e.g., Amazon Echo, Google Home and Apple HomePod), in instant messaging apps on both smartphones and via the Web (e.g., Facebook's M (virtual assistant) on both Facebook and Facebook Messenger apps or via the Web), built into a mobile operating system (OS) (e.g., Apple's Siri on iOS devices and BlackBerry Assistant on BlackBerry 10 devices, built into a desktop OS such as Cortana on Microsoft Windows OS), built into a smartphone independent of the OS (e.g., as is Bixby on the Samsung Galaxy S8 and Note 8), built on other mobile apps (e.g., Google Allo), within instant messaging platforms, assistants from specific organizations (e.g., Aeromexico's Aerobot on Facebook Messenger or Wechat Secretary on WeChat), integrated within mobile apps from specific companies and other organizations, integrated into smartwatches, appliances, cars, and wearables (e.g., Android Wear clothing).

The platforms that power the most widely used virtual assistants are also used to power other solutions. For example, Amazon Lex involves natural language understanding technology combined with automatic speech recognition. Google provides the Actions on Google and API.ai platforms for developers to create "Actions" for Google Assistant. Apple provides SiriKit for developers to create extensions for Sin. IBM's Watson is an entire artificial intelligence platform and community powering some virtual assistants, chatbots, and many other types of solutions.

Virtual assistants can provide a wide variety of services. For example, virtual assistants can be used to complement and/or replace customer service by humans (e.g., call centers), or to provide conversational e-commerce via various means of messaging, including via voice assistants, but also live chat on e-commerce Web sites, live chat on messaging apps (e.g., WeChat, Facebook Messenger and WhatsApp) and chatbots on messaging apps or web sites.

The bot engine 160 is an automated program (or software application) that runs a set of algorithms that establish a service or connection with a user 139 over the Internet, and executes automated tasks (scripts) to operate as an agent for a user or another program or simulates a human activity. Two types of bots include chatbots and social bots. A chatbot is a program that can simulate talk and converse with a human user. Social bots are algorithms designed to mimic human behaviors to converse with behavioral patterns similar to that of a human user. Google Assistant and Siri are considered forms of chat bots. Google Assistant and Siri allow people to ask questions and get a response using an AI system.

In one embodiment, the interaction platform 150 forwards content of the user message(s) 142 to the bot engine 160. In another embodiment, the bot engine 160 of the automated marketing system 200 can include web crawler functionality that monitors communications taking place over the interaction platform 150 to detect user messages that meet certain criteria, and process those user messages 142. Depending on the type of interaction platform 150, the interaction platform 150 can process the user message 142 before sending it to the bot engine 160. Regardless of whether the interaction platform 150 processes the user message 142, the interaction platform 150 ultimately sends the content of the user message 142 to the bot engine as a user message object 152. The user message object 152 includes the content of the user message 142 in either a processed or unaltered form.

As will be described in greater detail below with reference to FIG. 3, the bot engine 160 includes a bot logic module (not illustrated in FIG. 2) that includes a dialog management module (not illustrated in FIG. 2). The dialog management module processes each user message object 152 received by the bot engine 160, and generates a corresponding bot reply object 168 for each user message object 152 that includes a response 162 to the corresponding user message 142. Depending on the type of interaction platform 150, the interaction platform 150 can process the bot reply object 168 before sending the response 162 to the user system 140. By sending a bot reply object 168 in response to each user message 142, the bot engine 160 carries on a dialog or conversation with the user 139 in which the bot engine 160 automatically replies to and answers many common questions asked by the user 139. Although the bot engine 160 can conduct an intelligent conversation with the user 139, in some cases because the bot engine 160 is designed to generically interact with many users (e.g., consumers, prospective, customers, existing customers, etc.), the bot engine 160 is not designed to provide highly targeted content that is specific to the user 139. In addition, the bot engine 160 only interacts with the user when a session is active.

As will now be explained in greater detail below, the disclosed embodiments also include a marketing server system 180 that is integrated with a CRM system 102, 179 to provide targeted information to the user 139 even after the session with the bot engine 160 is over. The marketing server system 180 can use personalized data for a particular user that is stored at a CRM database 179 to provide content to that user that is targeted for that particular user. As such, the automated marketing system 200 can provide customers with the same or similar experience as traditional sales and service channels including providing each customer with a higher level of curated and targeted content, and other notifications, communications and marketing content.

The bot engine 160 processes the user message object 152 to generate session state information 165. The session state information is information that tracks past interactions between the bot engine 160 and the user 139 and can allow the bot engine 160 to understand where the conversation with the user 139 last left off (e.g., during a previous session when another new session resumes between the bot engine 160 and the user 139). The session state information can include, for example, information about the user 139, information about a most recent interaction between the bot engine 160, statements made by the user and the bot engine 160, keywords from the conversation between the user 139 and the bot engine 160, information provided as part of the conversation between the user 139 and the bot engine 160, indications of user intent or user sentiment of the user, information about a state of a transaction with the user 139, etc. The bot engine 160 sends the session state information 165 to the state engine 175. Upon receiving the session state information 165 from the bot engine 160, the state engine 175 stores the session state information 165 at the state logic data store 177. The state logic database 177 can be implemented in a data store (e.g., memory), which allows for relatively fast access to the session state information by the bot engine 160, as opposed to if the session state information were stored in a database such as the CRM database 130 since it would be more difficult to access from a database system. The session state information 165 stored at the state logic data store 177 is updated each time new session state information 165 is provided from the bot engine 160. This can allow the bot engine 160 to know the state of the transaction with a particular user at any given time so that if dialog with the user stops for some reason, and then resumes, the bot engine knows where the conversation ended and the state of the transaction/conversation with that user. As such, when a user is involved in dialog with the bot engine 160, stops conversing, then later resumes, the bot engine 160 knows the previous state of the transaction and can pick up where it left off during the previous communications with that user 139.

The automated marketing system 200 also includes a CRM system that includes a server system 102 that includes an application platform 110 configured or configurable to host and execute one or more CRM applications 170, and a CRM database engine 179 that includes a CRM database 130 that stores CRM records. The bot engine 160 can also process each user message object 152 to generate one or more of a record insert 164A or a query 164B based on the user message object 152, and send them to the application platform 110. When the application platform 110 receives a record insert 164A or a query 164B from the bot engine 160, the application platform 110 is can generate a user update message 174 based on the record insert 164A or the query 164B, and send the user update message 174 to the marketing server system 180. This is one example of how a user update message 174 can be generated. However, it is not limiting. For example, in another scenario, a user of a third-party system 190 could make a change to one of the CRM records at the CRM database 130, which can cause a user update message 174 being sent to the marketing server system 180. As will be explained below, regardless of how the user update message 174 is generated, the user update message 174 can trigger a response message 186 being sent from content distribution server 182 to the user system 140.

When the application platform 110 receives a query 164B from the bot engine 160, the CRM application 170 retrieve an existing CRM record 166 from the CRM database 130 in response to the query 164B, and can communicate that existing CRM record 166 back to the bot engine 160. Depending on the scenario and what the user message 142 entailed, the bot engine 160 can send the retrieved CRM record 166 to the user system 140, and/or use the record 166 to generate the response 162 that is included in the bot reply object 168 that is sent to the user 139. For example, in some circumstances when the user message 142 includes a query asking for specific information, the bot engine 160 can retrieve the CRM record 166, and then use information that is part of the CRM record 166 to generate the bot reply object 168 corresponding to that user message object 152. The response 162 (to the corresponding user message 142) that is included in the bot reply object 168 can be determined, based in part, on information from the CRM record 166. Although not illustrated in FIG. 2 due to space constraints, in one embodiment, the bot engine 160 can also access and retrieve data from the external third-party systems 190 (e.g., via the server system 102), and use that data in generating the response 162 that is included as part of the bot reply object 168.

In addition, when the application platform 110 receives a record insert 164A from the bot engine 160, the CRM application 170 can generate a new CRM record 167 based on the record insert 164A and store the new CRM record 167 at the CRM database 130. CRM records maintained at the CRM database 130 are accessible by users of external third-party systems 190 that have access privileges, and by users of marketing server system 180 who have been granted access privileges to access certain CRM records. Users of marketing server system 180, who have been granted access privileges to access certain CRM records, can access CRM records to determine additional information that can be helpful in generating response messages 186 that are sent to the user 139 in response to user update messages 174. This allows the marketing server system 180 to leverage personalized data for a particular user that is stored at the CRM database 179 to provide content to that user that is targeted for that particular user. Although not illustrated in FIG. 2 due to space constraints, the marketing server system 180 can also access and/or retrieve data from the external third-party systems 190 either directly or via the server system 102, and also use that data in generating responses messages 186 that are targeted for a particular user. The response messages 186 can include content responsive to the content of the user message 142 from the user message object 152 (e.g., content responsive to something in the user message 142). For instance, the response message 186 can include targeted marking information that is responsive to the content of the user message 142 and targeted for a particular user.

The marketing server system 180 includes a content distribution server 182 and a user information database 184. Whenever the marketing server system 180 receives a user update message 174, the content distribution server 182 can generate a response message 186 in response to the user update message 174.

The response messages 186 can include content responsive to the content of the user message 142 from the user message object 152 and that is targeted for a particular user. For example, the response message 186 can be a notification, an alert, an information message, a message asking the user 139 for additional information, a communication from a marketing agent or service that is sent to consumers, prospective customers, or existing customers in the hopes of either attaining their business or nurturing an existing or ongoing relationship. The communication can be, for example, a notification, a marketing message that includes marketing information, an advertising message or any other communication that includes marketing or promotional information, or information about a transaction (or a potential transaction) with the user 139. Depending on the implementation, the response message 186 can take many forms and be served to the user by various communication delivery methods. In some embodiments, the response message 186 is an electronic message, such as an email or text/SMS message. In other embodiments, the response message 186 is a social media message or social media advertisement. In other embodiments, the response message 186 can be a print-based message or advertisement (e.g., marketing materials delivered by physical mail including letters, forms, brochures, catalogs, postcards, newsletters and sales letters). In other embodiments, the response message 186 can be a voice message or conversation made from a live agent.

When the content distribution server 182 receives user reply message(s) 188 from the user 139 (e.g., via the user system 140), the content distribution server 182 generates a user information record for the user 139, or updates an existing user information record for the user 139, that is stored at the user information database 184. The content distribution server 182 updates the user information record for the user 139 each time a new user reply message 188 is received from the user system 140 (and each time each time a new user update message 174 is received from the application platform 110). As such, in one example, the response message 186 from the marketing server system 180 can be used to automatically solicit information from the user 139 (e.g., consumer or customer) assuming that the user 139 replies via a user reply message 188. For instance, as one non-limiting example, the user reply message 188 could include information from the user 139 that is relevant to a transaction or marketing effort with that user 139.

Figure 3:
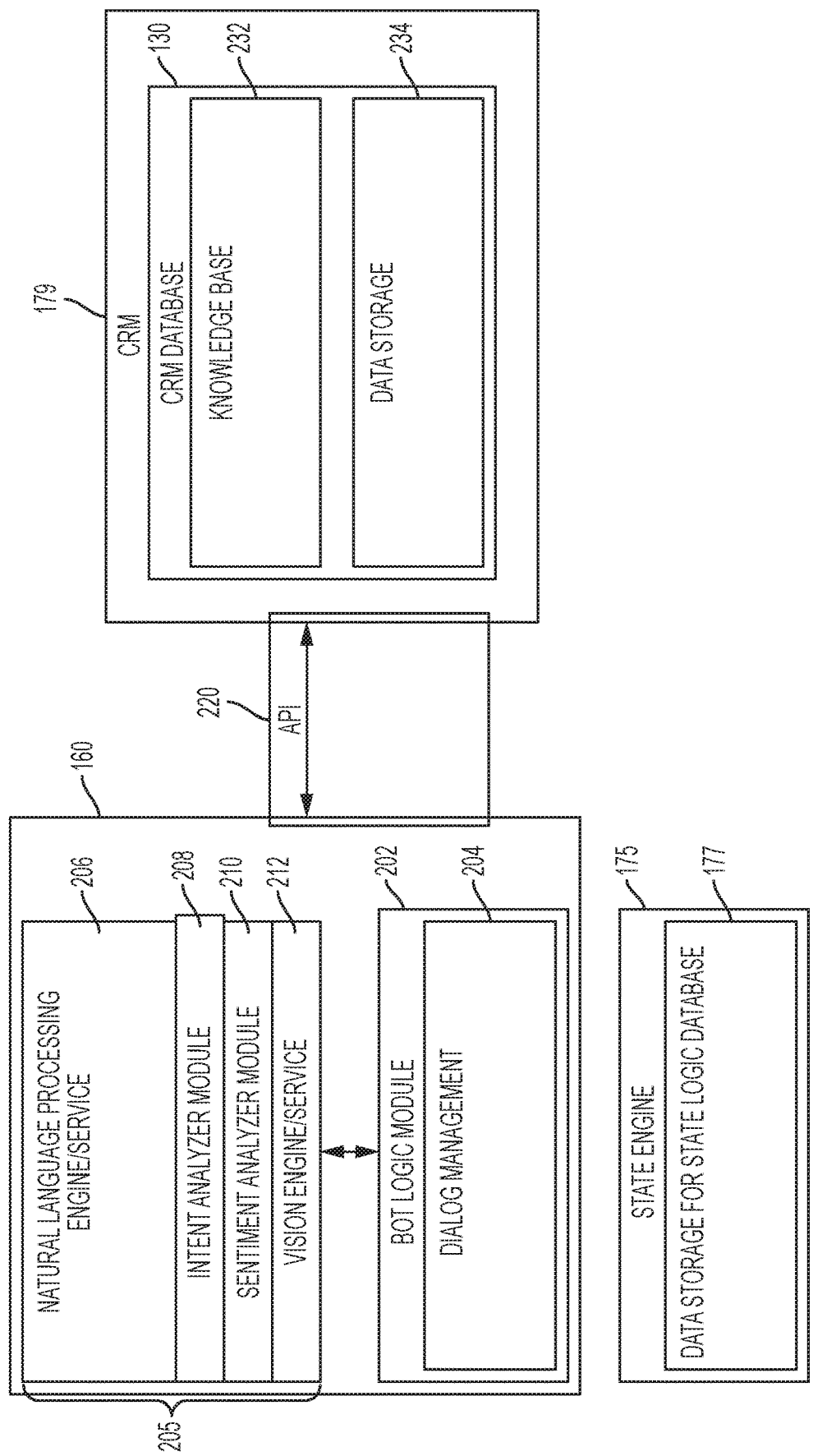
FIG. 3 is a block diagram of a bot architecture in accordance with the disclosed embodiments.

FIG. 3 is a block diagram of a bot architecture in accordance with the disclosed embodiments. FIG. 3 includes some of the same elements as FIG. 2 including the bot engine 160, the state engine 175 and the CRM database engine 179, and therefore will be described with continued reference to FIG. 2.

The bot engine 160 interfaces with the CRM database engine 179 via an application programming interface (API) 220. The CRM database engine 179 includes the CRM database 130 that stores information including a knowledge base 232 and data storage 234 among other things. The knowledge base 232 is a database of information that is used to equip the bot engine 160 with at least some of the information needed to respond to queries (and statements) submitted by the user 139. The data storage 234 is a data management layer that is used to track user attributes, user data, CRM records created as part of transactions with the users, and other analytics.

The bot engine 160 also interfaces with the state engine 175 that includes data storage for the state logic data store 177, which is another data management layer used to track interaction history of each user with the bot engine 160 and the state of each transaction with each user.

In this embodiment, the bot engine 160 includes a bot logic module 202 and an artificial intelligence engine 205 that interfaces with the bot logic module 202. The bot logic module 202 includes a dialog management module 204 that processes each user message object 152 received by the bot engine 160 and is responsible generating a corresponding bot reply object 168 for each user message object 152 (that includes a response to the corresponding user message 142) based on input information provided from the artificial intelligence engine 205. To explain further, the artificial intelligence engine 205 can process each user message object 152 and generate information that is provided to the bot logic module 202, where the dialog management module 204 uses that input information to generate a corresponding bot reply object 168 for each user message object 152 that includes a response to the corresponding user message 142. This allows the bot engine 160 to carry on an intelligent dialog with the user 139, while also maintaining, at data storage of a state logic data store 177, session state information as described above.

In one implementation, Salesforce Einstein or similar AI technologies can be used to implement advanced AI capabilities at the bot engine 160 that can help enhance sales, service, marketing conversations with users to provide a personalized and predictive experience for the user. Salesforce Einstein embeds advanced AI capabilities in the Salesforce Platform—in fields, objects, workflows, components and more. Salesforce Einstein leverages all the customer data in Salesforce including activity data from Salesforce Chatter, email, calendar and e-commerce; social data streams such as tweets and images; and even IoT signals—to train predictive models for sales, service, marketing, commerce and more. Powered by advanced machine learning, deep learning, predictive analytics, natural language processing and smart data discovery, Salesforce Einstein can allow models to be automatically customized. These models learn, self-tune and get smarter with every interaction and additional piece of data. Salesforce Einstein can automatically discover and/or predict the best responses to user messages.

In this embodiment, the artificial intelligence engine 205 includes various modules including a natural language processing engine 206, an intent analyzer nodule 208, a sentiment analyzer nodule 210, and a vision engine 212 that can each generate information that can be used by the dialog management module 204 to determine content of the bot reply object 168 that should be used when responding or replying to a corresponding user message 142 from the user 139.

The natural language processing engine 206 parses the content of each user message object 152 and processes the language to determine context of a corresponding user message 142. The natural language processing engine 206 translates the content of each user message object 152 into generate one or more appropriate responses to each corresponding user message 142 for use in generating the bot reply object 168 corresponding to each user message 142. For example, the natural language processing engine 206 can determine context can by understanding structure (syntax) of the content of the user message 142 (obtained from the user message object 152), meaning (or semantics) of the content of the user message 142 (obtained from the user message object 152) and pragmatics (e.g., purpose of the message) so that the natural language processing engine 206 can translate the content of that user message 142 into information that can be used to generate appropriate responses (via the bot reply object). The natural language processing engine 206 can identify keywords that are part of the content, parse the content into different categories, identify relationships between words in a sentence, and compare the content to stored patterns to filter out or determine context, and then determine potential responses that are appropriate, which can then be used along with other types of information (generated by each of the other modules that make up the artificial intelligence engine 205) to generate the bot reply object. For example, artificial intelligence technologies can provide, for example, recommendations to narrow down the possible responses, and prioritize the order for the possible responses. The predictive capabilities of AI can be used, for example, to predict the which responses are likely to be useful, and make smart recommendations based on combinations of keywords or phrases, the user intent, user sentiment.

The intent analyzer nodule 208 can also process the content of each user message object 152 to determine user intent based on that user message object 152 and generate user intent information. The intent analyzer nodule 208 can then provide the user intent information to the bot logic module 202 for use in generating the bot reply object 168 corresponding to each user message 142. For example, in one embodiment, the intent analyzer nodule 208 can process the content of each user message object 152 to extract relevant information that can be used determine or predict the user's intent (e.g., casual intent versus business/transaction intent based on intention-keywords, specific to their market and business, etc.). The dialog management module 204 can take into account the user intent information (and outputs generated by each of the other modules that make up the artificial intelligence engine 205) to generate an appropriate response that can be included as content of the bot reply object 168 that is used to respond to a particular user message 142.

The sentiment analyzer nodule 210 can process the content of each user message object 152 to determine user sentiment based on that user message object 152 and generate user sentiment information. The sentiment analyzer nodule 210 can provide the user sentiment information to the bot logic module 202 for use in generating the bot reply object 168 corresponding to each user message 142. For example, in one embodiment, the sentiment analyzer nodule 210 can process the content of each user message 142 to determine or predict the sentiment of the text (e.g., whether the text conveys questions, judgment, opinion, reviews, etc.) so that the user sentiment information can be used by the dialog management module 204 (along with outputs generated by each of the other modules that make up the artificial intelligence engine 205) to generate an appropriate response that can be included as content of the bot reply object 168 that is used to respond to a particular user message 142.

The vision engine 212 can process any attachment information associated with each user message object 152 to determine content of the attachment information associated with that user message object 152. For instance, an image classification module (not illustrated) can recognize keywords, logos, objects, etc. in attached images to discover new insights about the user even if a name or keywords aren't mentioned in the text of the attachment information. Based on the content of the attachment information, the vision engine 212 can generate supplemental information (e.g., that is responsive to the attachment information), and provide the supplemental information to the bot logic module 202 for use in generating the bot reply object 168 corresponding to each user message 142.

In addition, the artificial intelligence engine 205 can also leverage AI technologies to process CRM data and identify CRM records that provide highest order of match for the user 139. A discovery module can perform analysis to find insights in millions of data combinations by automatically examining all variable combinations. Prediction modules can be standard or custom AI models that analyze any Salesforce field or object type to predict and rank relevant CRM records for that field or object type. A recommendations module can be used to provide recommendations that recommend the next best product, content, or offer faster for the user. An engagement scoring module can discover insights about the user to drive smarter marketing using predicted behavior.

Figure 4A:
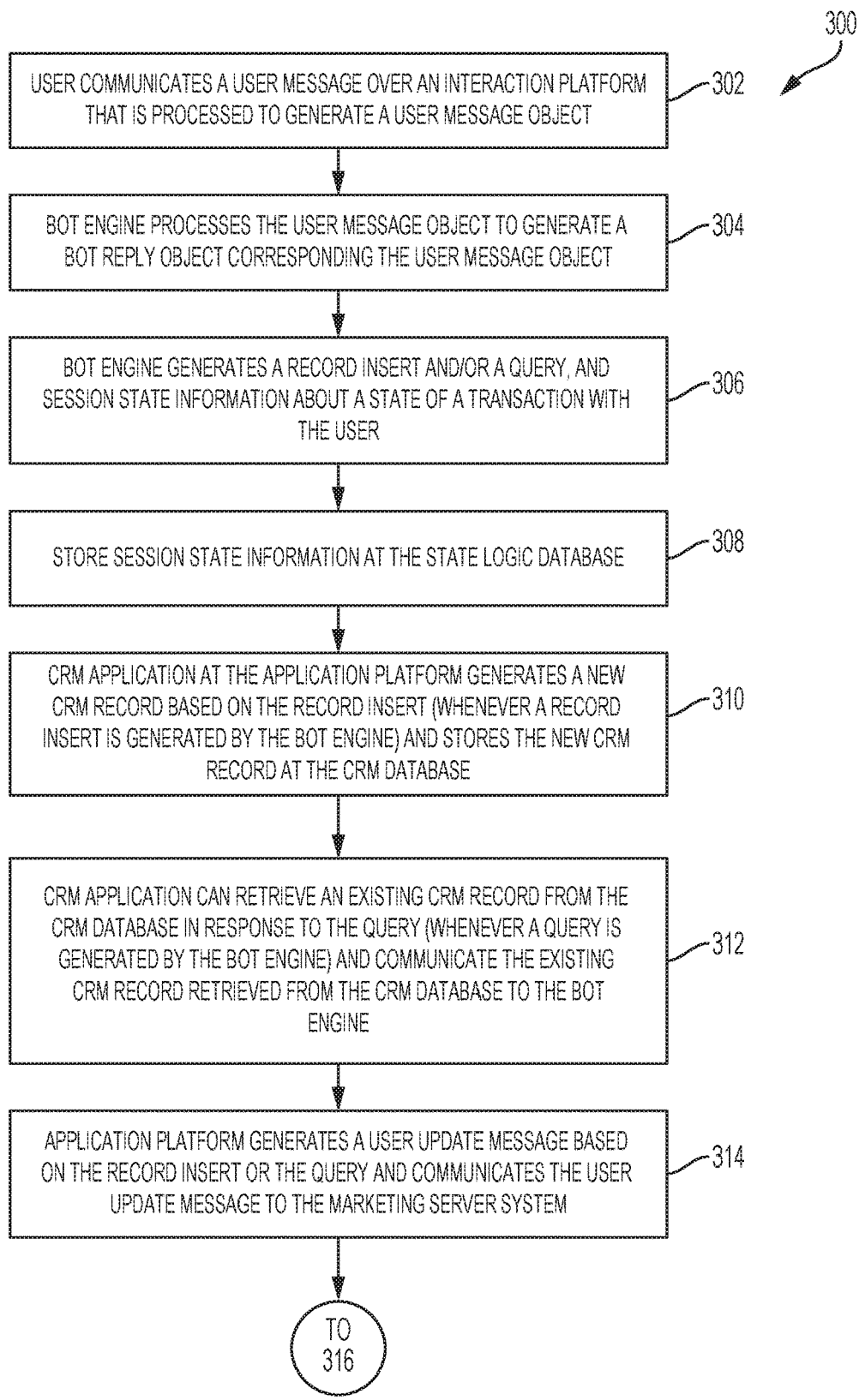
FIGS. 4A and 4B are a flowchart that collectively illustrate a method for automatically sending a user content, responsive to a user message from that user, to solicit additional information from that user according to the disclosed embodiments.
Figure 4B:
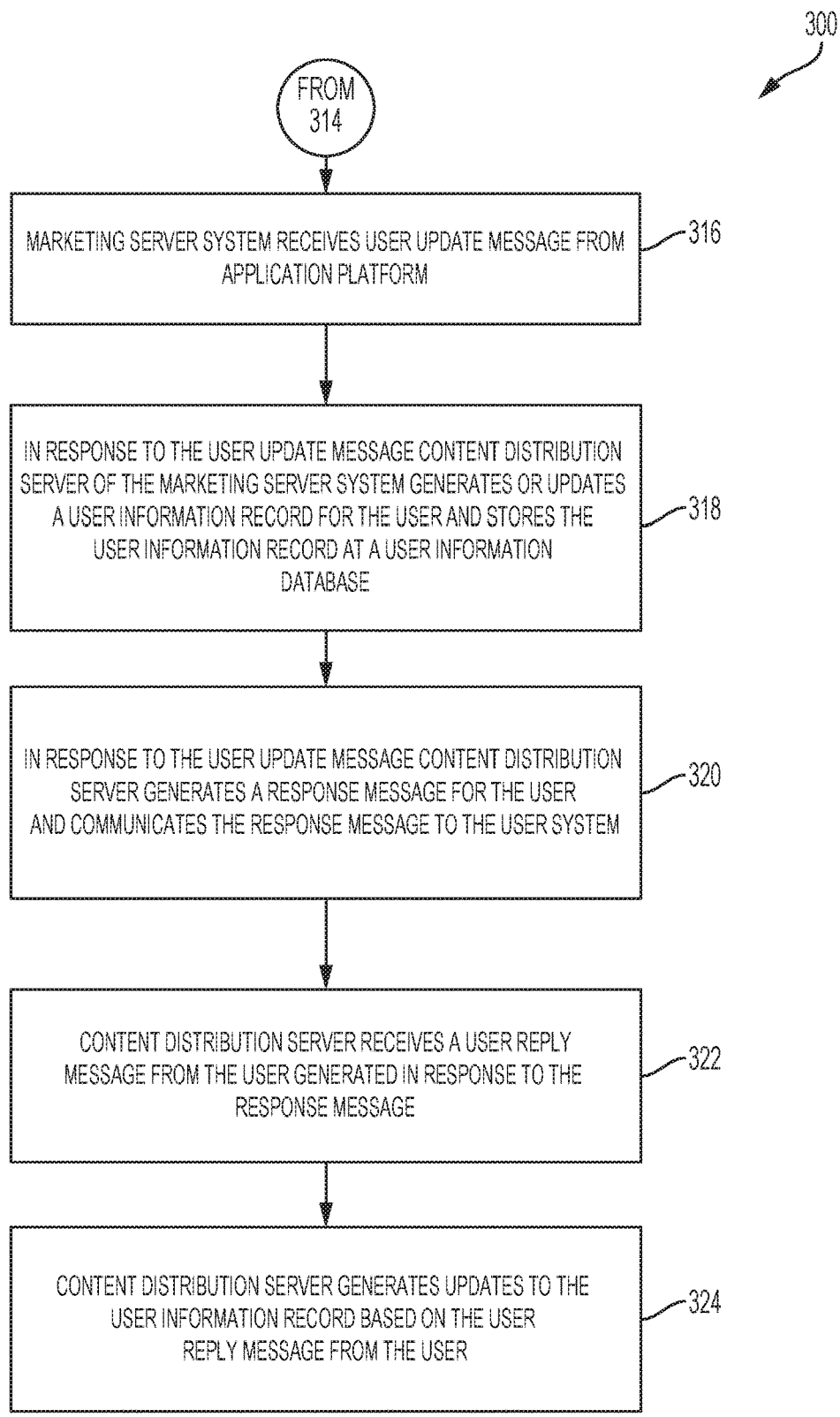

FIGS. 4A and 4B are a flowchart that collectively illustrate a method 300 for automatically (sending a user 139 (e.g., a consumer, a prospective customer, an existing customer, etc.) content, that is responsive to content of a user message 142 from that user 139, to solicit additional information from that user 139 according to the disclosed embodiments. The method 300 can be repeated each time the user communicates a new user message 142 via the user system 140. FIGS. 4A and 4B will be described with continued reference to FIGS. 1-3. With respect to FIGS. 4A and 4B, the steps of each method shown are not necessarily limiting. Steps can be added, omitted, and/or performed simultaneously without departing from the scope of the appended claims. Each method may include any number of additional or alternative tasks, and the tasks shown need not be performed in the illustrated order. Each method may be incorporated into a more comprehensive procedure or process having additional functionality not described in detail herein. Moreover, one or more of the tasks shown could potentially be omitted from an embodiment of each method as long as the intended overall functionality remains intact. Further, each method is computer-implemented in that various tasks or steps that are performed in connection with each method may be performed by software, hardware, firmware, or any combination thereof. For illustrative purposes, the following description of each method may refer to elements mentioned above in connection with FIGS. 1-3. In certain embodiments, some or all steps of these methods, and/or substantially equivalent steps, are performed by execution of processor-readable instructions stored or included on a processor-readable medium by one or more hardware processors. For instance, in the description of FIGS. 4A and 4B that follows, the user system 140, the interaction platform 150, the bot engine 160, the state engine 175, the server system 102, the CRM database engine 179, and the marketing server system 180 can be described as performing various acts, tasks or steps, but it should be appreciated that this refers to processing system(s) of these entities executing instructions to perform those various acts, tasks or steps. Depending on the implementation, some of the processing system(s) can be centrally located, or distributed among a number of server systems that work together.

Referring again to FIG. 4A, the method 300 begins at 302 when a user communicates a user message 142 over an interaction platform 150 via a user system 140. In some embodiments, the interaction platform 150 forwards content of the user message 142 to the bot engine as user message object 152 (e.g., does not perform any processing with respect to the user message 142). In other embodiments, the interaction platform 150 can process the user message 142 to generate a user message object 152 that comprises the content of the user message 142. For instance, in some embodiments, the user message object 152 is processed at the interaction platform 150 so that it is formatted in accordance with a convention or protocol adapted for a bot engine 160 so that it can be processed at the bot engine 160.

At 304, the bot engine 160 processes the user message object 152 to generate a corresponding bot reply object 168 for the user message object 152 that includes a response to the content of the corresponding user message 142.

At 306, based on the user message object 152, the bot engine 160 can also generate a record insert 164A and/or a query 164B, and session state information 165 (described above). At 308, the session state information 165 from the bot engine 160 is stored at the state logic data store 177 of the state engine 175. Each time new session state information 165 is provided from the bot engine 160, the session state information 165 stored at the state logic data store 177 can be updated.

At 310, the CRM application 170, executed at the application platform 110 of the server system 102, can generate a new CRM record 167 based on the record insert 164A (whenever a record insert is generated by the bot engine 160) and store the new CRM record 167 at the CRM database 130.

At 312, the CRM application 170 can retrieve an existing CRM record 166 from the CRM database 130 in response to the query 164B (whenever a query is generated by the bot engine 160) and communicate the existing CRM record 166 retrieved from the CRM database 130 to the bot engine 160. At 314, the application platform 110 can generate a user update message 174 based on the record insert 164A or the query 164B and communicate the user update message to the marketing server system 180.

Referring now to FIG. 4B, the method 300 continues at 316, where the marketing server system 180 receives the user update message 174 from the application platform 110. At 318, the content distribution server 182 of the marketing server system 180 updates or generates a user information record for the user (in response to the user update message 174) and stores the user information record at the user information database 184. The content distribution server 182 generates updates to the user information record each time a new user update message 174 is received from the application platform 110.

At 320, the content distribution server 182 also generates a response message 186 for the user 139 (in response to the user update message 174), and communicates the response message 186 to the user system 140. As noted above, the response messages 186 can include, for example, content responsive to the content of the user message 142 from the user message object 152 that is targeted for a particular user 139. The marketing server system 180 can use personalized data for the particular user that is stored at CRM database 179 and/or data from external third-party systems 190 to better tailor the content of the response message so that it is targeted for that particular user. At 322, the content distribution server 182 receives the user reply message 188 from the user system 140. The user reply message from the user 188 is created or generated by a particular user 139. The user reply message 188 from the user 139 can include content pertaining to the user 139 that is responsive to the content of the response message 186 from the content distribution server 182. For instance, as one non-limiting example, a user reply message 188 can include information about or associated with that particular user that is responsive to the response message 186 (e.g., information associated with or particular to that user and/or associated with and particular to a particular transaction that the user is part of). For example, the user reply message 188 from the user 139 can be a comment or acknowledgement, or can be any type of communication related to the user, sales, or service. For instance, in some cases, the user reply message 188 from the user 139 can include customer information associated with the user (e.g., customer information that is responsive to the response message 186) such as information about the user, information about a state of a transaction with the user, or other information that is relevant to a transaction, sale or service. At 324, the content distribution server 182 generates updates to the user information record based on the user reply message 188 that is received from the user system 140. The content distribution server 182 generates updates to the user information record each time a user reply message 188 is received from the user system 140.

Figure 5:
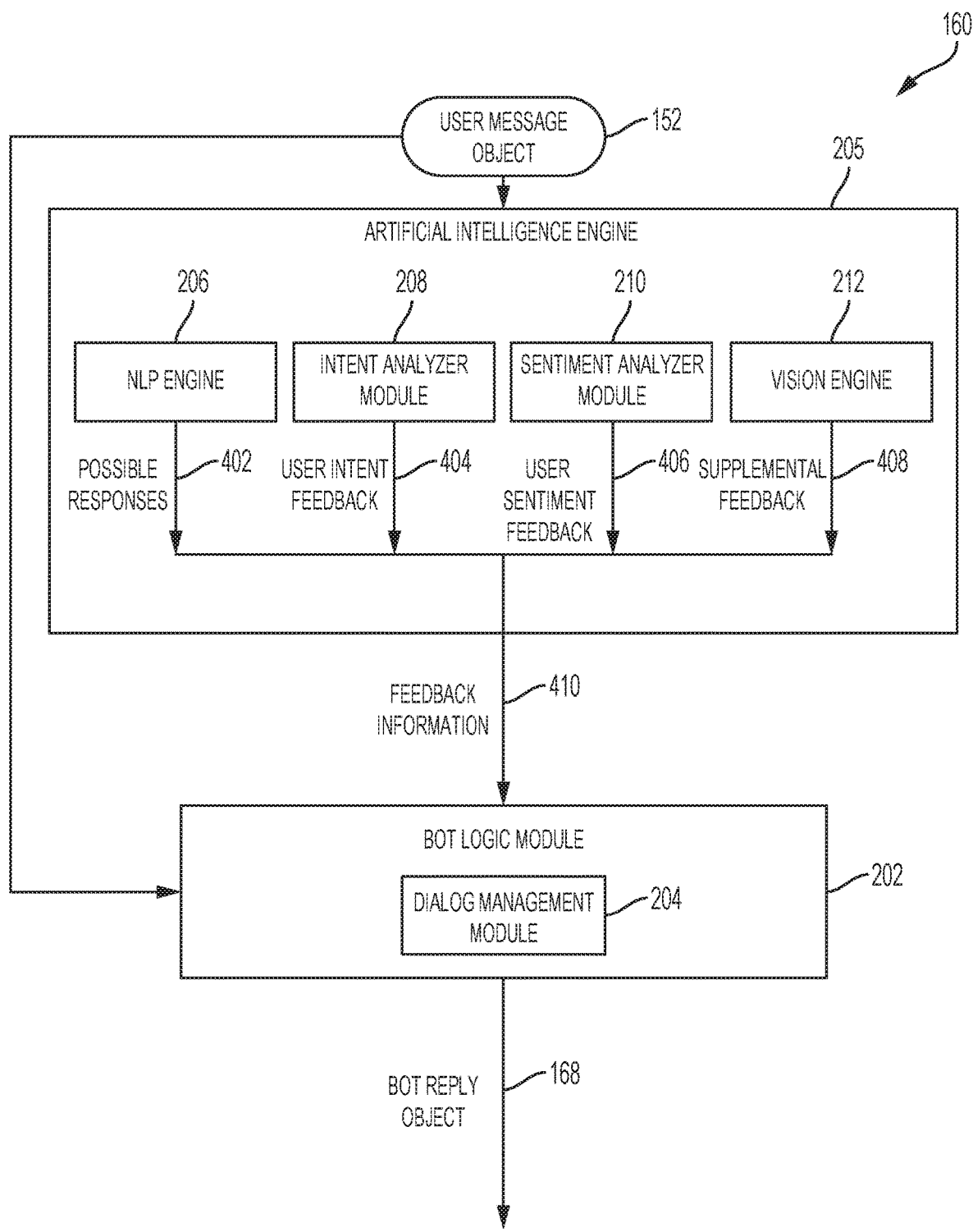
FIG. 5 is a flow diagram illustrating a processing performed by a bot engine to process content of a user message object to generate a corresponding bot reply object according to the disclosed embodiments.

FIG. 5 is a flow diagram illustrating a processing performed by a bot engine 160 to process content of a user message object 152 to generate a corresponding bot reply object 168 according to the disclosed embodiments. The corresponding bot reply object 168 includes a response to the user message 142 that corresponds to that user message object 152. As described above, the bot engine 160 includes a bot logic module 202 that includes a dialog management module 204 that can process the user message object 152 received by the bot engine 160 to generate the bot reply object 168 corresponding to the user message object 152. In some embodiments, the bot engine 160 also includes an artificial intelligence engine 205 that interfaces with the bot logic module 202. As will be described below, the artificial intelligence engine 205 can also process the user message object 152 to generate input information 410 that is provided to the bot logic module 202, which can then be used by the dialog management module 204 of the artificial intelligence engine 205 to generate the bot reply object 168. In this example, the dialog management module 204 can receive inputs from one or more various engines and modules 206, 208, 210, 212 as will now be described below.

For example, the natural language processing engine 206 of the artificial intelligence engine 205 processes content of the user message object 152 to determine context of the user message 142, and generates, based on the context of the user message 142, at least one appropriate response 402 to that user message 142. The natural language processing engine 206 provides the appropriate response(s) 402 to the dialog management module 204 of the bot logic module 202 for use in generating the bot reply object 168 that corresponds to that user message object 152 and its corresponding user message 142.

The intent analyzer nodule 208 of the artificial intelligence engine 205 processes the content of each user message object 152 received by the bot engine 160 to determine user intent, based on the content of that user message object 152, and generates user intent information 404. The intent analyzer nodule 208 provides the user intent information 404 to the dialog management module 204 of the bot logic module 202 for use in generating the bot reply object 168 that corresponds to that user message object 152 and its corresponding user message 142.

The sentiment analyzer nodule 210 processes the content of the user message object 152 to determine user sentiment based on the content of that user message object 152, and generates user sentiment information 406. The sentiment analyzer nodule 210 provides the user sentiment information 406 to the dialog management module 204 of the bot logic module 202 for use in generating the bot reply object 168 that corresponds to that user message object 152 and its corresponding user message 142.

When the user message object 152 includes attachment information, the vision engine 212 processes any attachment information associated with the user message object 152 to determine content of the attachment information, and generates supplemental information 408 in response to the attachment information (i.e., that is associated with that user message object 152). The vision engine 212 provides the supplemental information 408 to the dialog management module 204 of the bot logic module 202 for use in generating the bot reply object 168 that corresponds to that user message object 152 and its corresponding user message 142.

The dialog management module 204 of the bot logic module 202 processes the user message object 152 based on one or more sources of the input information 410 provided from the artificial intelligence engine 205 to generate the bot reply object 168 that corresponds to that user message object 152 and its corresponding user message 142.

The following description is of one example of a system in which the features described above may be implemented. The components of the system described below are merely one example and should not be construed as limiting. The features described above with respect to FIGS. 1-5 may be implemented in any other type of computing environment, such as one with multiple servers, one with a single server, a multi-tenant server environment, a single-tenant server environment, or some combination of the above.

Figure 6:
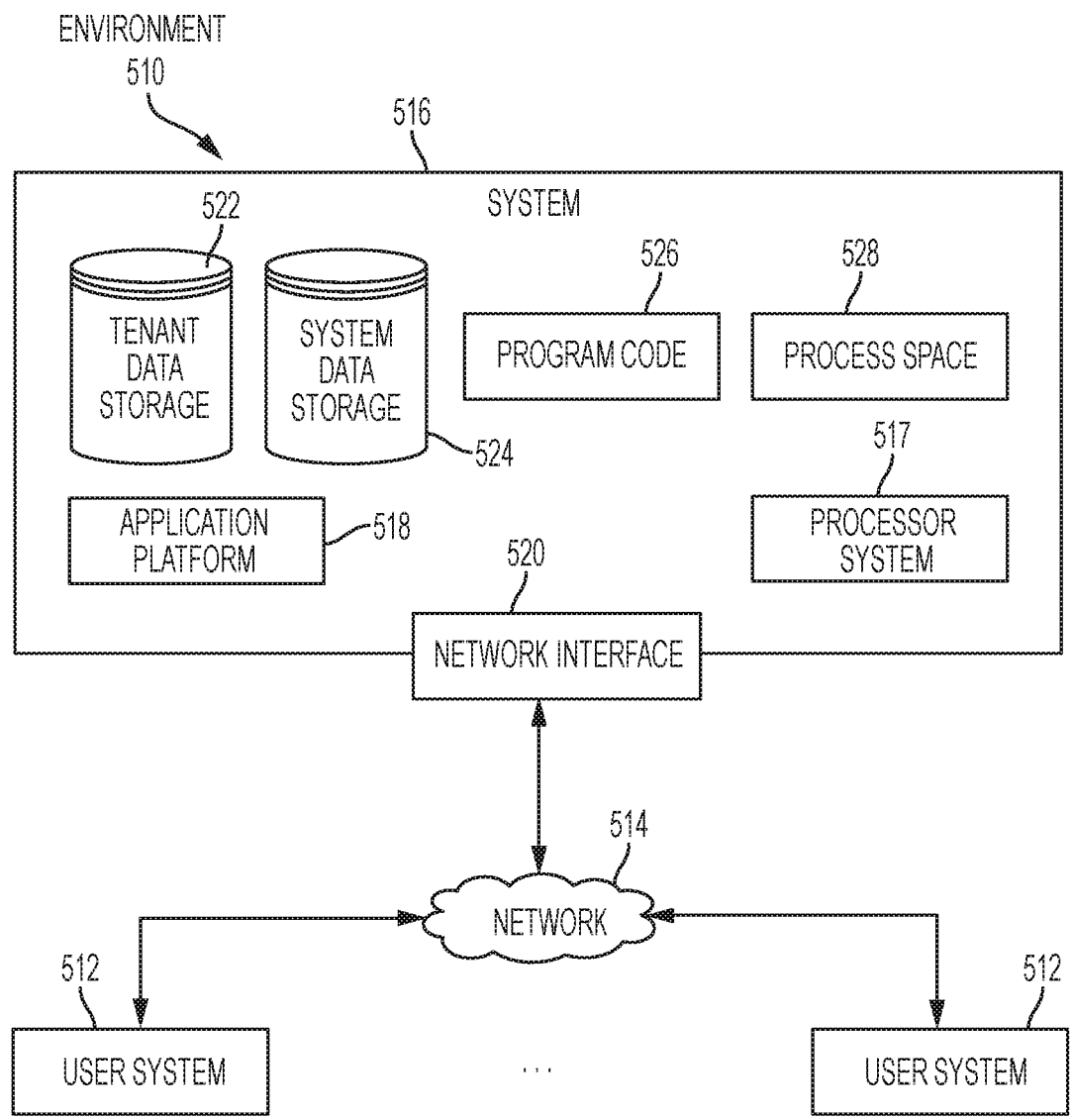
FIG. 6 is a block diagram that illustrates an example of an environment in which an on-demand database service can be used in accordance with some implementations.

FIG. 6 shows a block diagram of an example of an environment 510 in which an on-demand database service can be used in accordance with some implementations. The environment 510 includes user systems 512, a network 514, a database system 516 (also referred to herein as a "cloud-based system"), a processor system 517, an application platform 518, a network interface 520, tenant database 522 for storing tenant data 523, system database 524 for storing system data 525, program code 526 for implementing various functions of the system 516, and process space 528 for executing database system processes and tenant-specific processes, such as running applications as part of an application hosting service. In some other implementations, environment 510 may not have all of these components or systems, or may have other components or systems instead of, or in addition to, those listed above.

In some implementations, the environment 510 is an environment in which an on-demand database service exists. An on-demand database service, such as that which can be implemented using the system 516, is a service that is made available to users outside of the enterprise(s) that own, maintain or provide access to the system 516. As described above, such users generally do not need to be concerned with building or maintaining the system 516. Instead, resources provided by the system 516 may be available for such users' use when the users need services provided by the system 516; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 518 can be a framework that allows the applications of system 516 to execute, such as the hardware or software infrastructure of the system 516. In some implementations, the application platform 518 enables the creation, management and execution of one or more applications developed by the provider of the on-demand database service, users accessing the on-demand database service via user systems 512, or third-party application developers accessing the on-demand database service via user systems 512.

In some implementations, the system 516 implements a web-based customer relationship management (CRM) system. For example, in some such implementations, the system 516 includes application servers configured to implement and execute CRM software applications as well as provide related data, code, forms, renderable web pages and documents and other information to and from user systems 512 and to store to, and retrieve from, a database system related data, objects, and Web page content. In some MTS implementations, data for multiple tenants may be stored in the same physical database object in tenant database 522. In some such implementations, tenant data is arranged in the storage medium(s) of tenant database 522 so that data of one tenant is kept logically separate from that of other tenants so that one tenant does not have access to another tenant's data, unless such data is expressly shared. The system 516 also implements applications other than, or in addition to, a CRM application. For example, the system 516 can provide tenant access to multiple hosted (standard and custom) applications, including a CRM application. User (or third-party developer) applications, which may or may not include CRM, may be supported by the application platform 518. The application platform 518 manages the creation and storage of the applications into one or more database objects and the execution of the applications in one or more virtual machines in the process space of the system 516.

According to some implementations, each system 516 is configured to provide web pages, forms, applications, data and media content to user (client) systems 512 to support the access by user systems 512 as tenants of system 516. As such, system 516 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 514 can be or include any network or combination of networks of systems or devices that communicate with one another. For example, the network 514 can be or include any one or any combination of a LAN (local area network), WAN (wide area network), telephone network, wireless network, cellular network, point-to-point network, star network, token ring network, hub network, or other appropriate configuration. The network 514 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 512 can communicate with system 516 using TCP/IP and, at a higher network level, other common Internet protocols to communicate, such as HTTP, FTP, AFS, WAP, etc. In an example where HTTP is used, each user system 512 can include an HTTP client commonly referred to as a "web browser" or simply a "browser" for sending and receiving HTTP signals to and from an HTTP server of the system 516. Such an HTTP server can be implemented as the sole network interface 520 between the system 516 and the network 514, but other techniques can be used in addition to or instead of these techniques. In some implementations, the network interface 520 between the system 516 and the network 514 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 512 can be implemented as any computing device(s) or other data processing apparatus or systems usable by users to access the database system 516. For example, any of user systems 512 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 512 typically executes an HTTP client, for example, a web browsing (or simply "browsing") program, such as a web browser based on the WebKit platform, Microsoft's Internet Explorer browser, Netscape's Navigator browser, Opera's browser, Mozilla's Firefox browser, or a WAP-enabled browser in the case of a cellular phone, PDA or other wireless device, or the like, allowing a user (for example, a subscriber of on-demand services provided by the system 516) of the user system 512 to access, process and view information, pages and applications available to it from the system 516 over the network 514.

Each user system 512 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 512 in conjunction with pages, forms, applications and other information provided by the system 516 or other systems or servers. For example, the user interface device can be used to access data and applications hosted by system 516, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 512 may differ in their respective capacities, and the capacity of a particular user system 512 can be entirely determined by permissions (permission levels) for the current user of such user system. For example, where a salesperson is using a particular user system 512 to interact with the system 516, that user system can have the capacities allotted to the salesperson. However, while an administrator is using that user system 512 to interact with the system 516, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 512 and some or all of its components are operator-configurable using applications, such as a browser, including computer code executed using a central processing unit (CPU) such as an Intel Pentium® processor or the like. Similarly, the system 516 (and additional instances of an MTS, where more than one is present) and all of its components can be operator-configurable using application(s) including computer code to run using the processor system 517, which may be implemented to include a CPU, which may include an Intel Pentium® processor or the like, or multiple CPUs.

The system 516 includes tangible computer-readable media having non-transitory instructions stored thereon/in that are executable by or used to program a server or other computing system (or collection of such servers or computing systems) to perform some of the implementation of processes described herein. For example, computer program code 526 can implement instructions for operating and configuring the system 516 to intercommunicate and to process web pages, applications and other data and media content as described herein. In some implementations, the computer code 526 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 7:
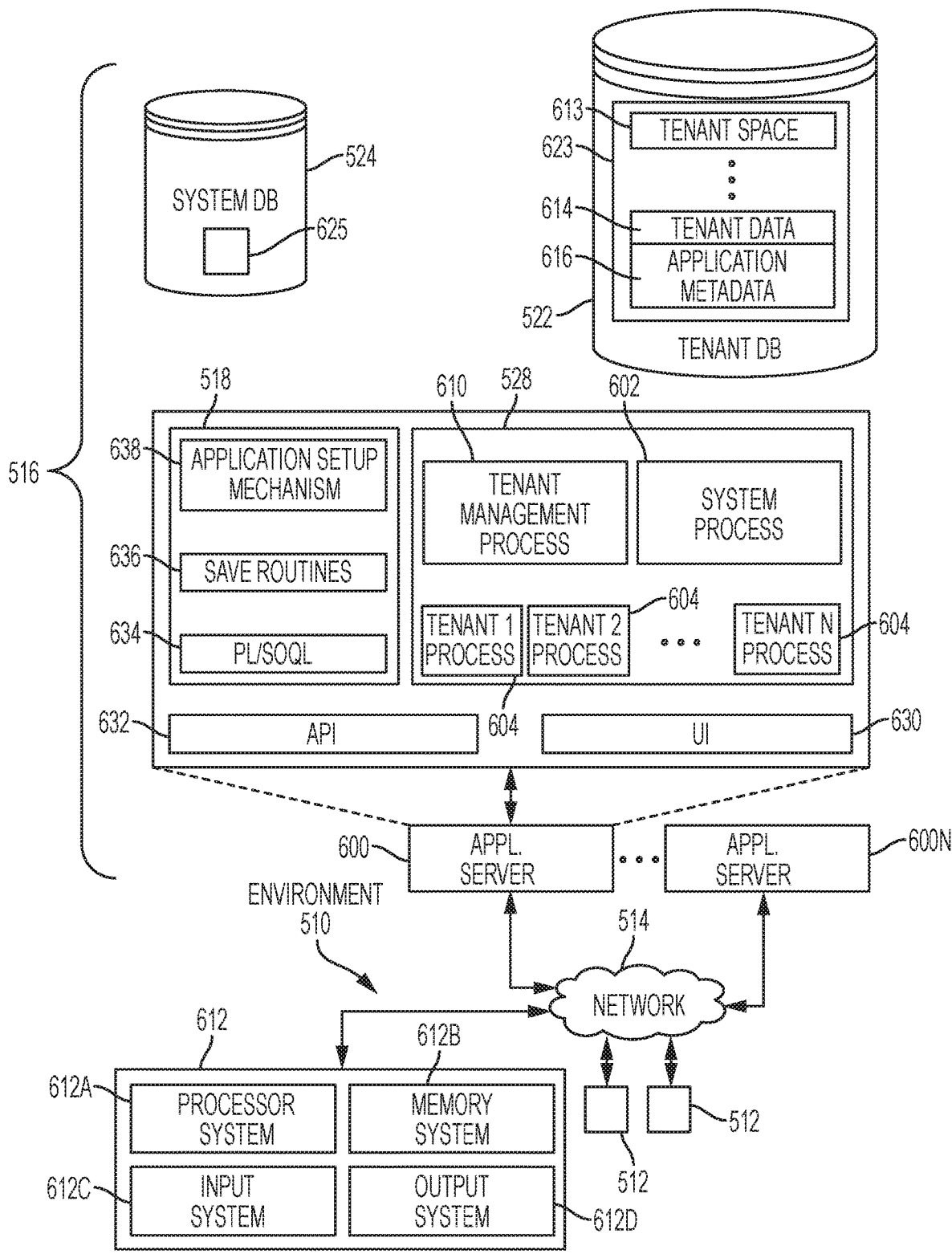
FIG. 7 is a block diagram that illustrates example implementations of elements of FIG. 6 and example interconnections between these elements according to some implementations.

FIG. 7 shows a block diagram of example implementations of elements of FIG. 6 and example interconnections between these elements according to some implementations. That is, FIG. 7 also illustrates environment 510, but FIG. 7, various elements of the system 516 and various interconnections between such elements are shown with more specificity according to some more specific implementations. Elements from FIG. 6 that are also shown in FIG. 7 will use the same reference numbers in FIG. 7 as were used in FIG. 6. Additionally, in FIG. 7, the user system 512 includes a processor system 612A, a memory system 612B, an input system 612C, and an output system 612D. The processor system 612A can include any suitable combination of one or more processors. The memory system 612B can include any suitable combination of one or more memory devices. The input system 612C can include any suitable combination of input devices, such as one or more touchscreen interfaces, keyboards, mice, trackballs, scanners, cameras, or interfaces to networks. The output system 612D can include any suitable combination of output devices, such as one or more display devices, printers, or interfaces to networks.

In FIG. 7, the network interface 520 of FIG. 6 is implemented as a set of HTTP application servers 6001-1400N. Each application server 600, also referred to herein as an "app server," is configured to communicate with tenant database 522 and the tenant data 623 therein, as well as system database 524 and the system data 625 therein, to serve requests received from the user systems 612. The tenant data 623 can be divided into individual tenant storage spaces 613, which can be physically or logically arranged or divided. Within each tenant storage space 613, tenant data 614 and application metadata 616 can similarly be allocated for each user.

The process space 528 includes system process space 602, individual tenant process spaces 604 and a tenant management process space 610. The application platform 518 includes an application setup mechanism 638 that supports application developers' creation and management of applications. Such applications and others can be saved as metadata into tenant database 522 by save routines 636 for execution by subscribers as one or more tenant process spaces 604 managed by tenant management process 610, for example. Invocations to such applications can be coded using PL/SOQL 634, which provides a programming language style interface extension to API 632. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 516 for the subscriber making the invocation and executing the metadata as an application in a virtual machine.

The system 516 of FIG. 7 also includes a user interface (UI) 630 and an application programming interface (API) 632 to system 516 resident processes to users or developers at user systems 612. In some other implementations, the environment 510 may not have the same elements as those listed above or may have other elements instead of, or in addition to, those listed above.

Each application server 600 can be communicably coupled with tenant database 522 and system database 524, for example, having access to tenant data 623 and system data 625, respectively, via a different network connection. For example, one application server 6001 can be coupled via the network 514 (for example, the Internet), another application server 600N can be coupled via a direct network link, and another application server (not illustrated) can be coupled by yet a different network connection. Transfer Control Protocol and Internet Protocol (TCP/IP) are examples of typical protocols that can be used for communicating between application servers 600 and the system 516. However, it will be apparent to one skilled in the art that other transport protocols can be used to optimize the system 516 depending on the network interconnections used.

In some implementations, each application server 600 is configured to handle requests for any user associated with any organization that is a tenant of the system 516. Because it can be desirable to be able to add and remove application servers 600 from the server pool at any time and for various reasons, in some implementations there is no server affinity for a user or organization to a specific application server 600. In some such implementations, an interface system implementing a load balancing function (for example, an F5

Big-IP load balancer) is communicably coupled between the application servers 600 and the user systems 612 to distribute requests to the application servers 600. In one implementation, the load balancer uses a least-connections algorithm to route user requests to the application servers 600. Other examples of load balancing algorithms, such as round robin and observed-response-time, also can be used. For example, in some instances, three consecutive requests from the same user could hit three different application servers 600, and three requests from different users could hit the same application server 600. In this manner, by way of example, system 516 can be a multi-tenant system in which system 516 handles storage of, and access to, different objects, data and applications across disparate users and organizations.

In one example storage use case, one tenant can be a company that employs a sales force where each salesperson uses system 516 to manage aspects of their sales. A user can maintain contact data, leads data, customer follow-up data, performance data, goals and progress data, etc., all applicable to that user's personal sales process (for example, in tenant database 522). In an example of a MTS arrangement, because all of the data and the applications to access, view, modify, report, transmit, calculate, etc., can be maintained and accessed by a user system 612 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 516 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 516 also can maintain system level data usable by multiple tenants or other data. Such system level data can include industry reports, news, postings, and the like that are sharable among tenants.

In some implementations, the user systems 612 (which also can be client systems) communicate with the application servers 600 to request and update system-level and tenant-level data from the system 516. Such requests and updates can involve sending one or more queries to tenant database 522 or system database 524. The system 516 (for example, an application server 600 in the system 516) can automatically generate one or more SQL statements (for example, one or more SQL queries) designed to access the desired information. System database 524 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 8:
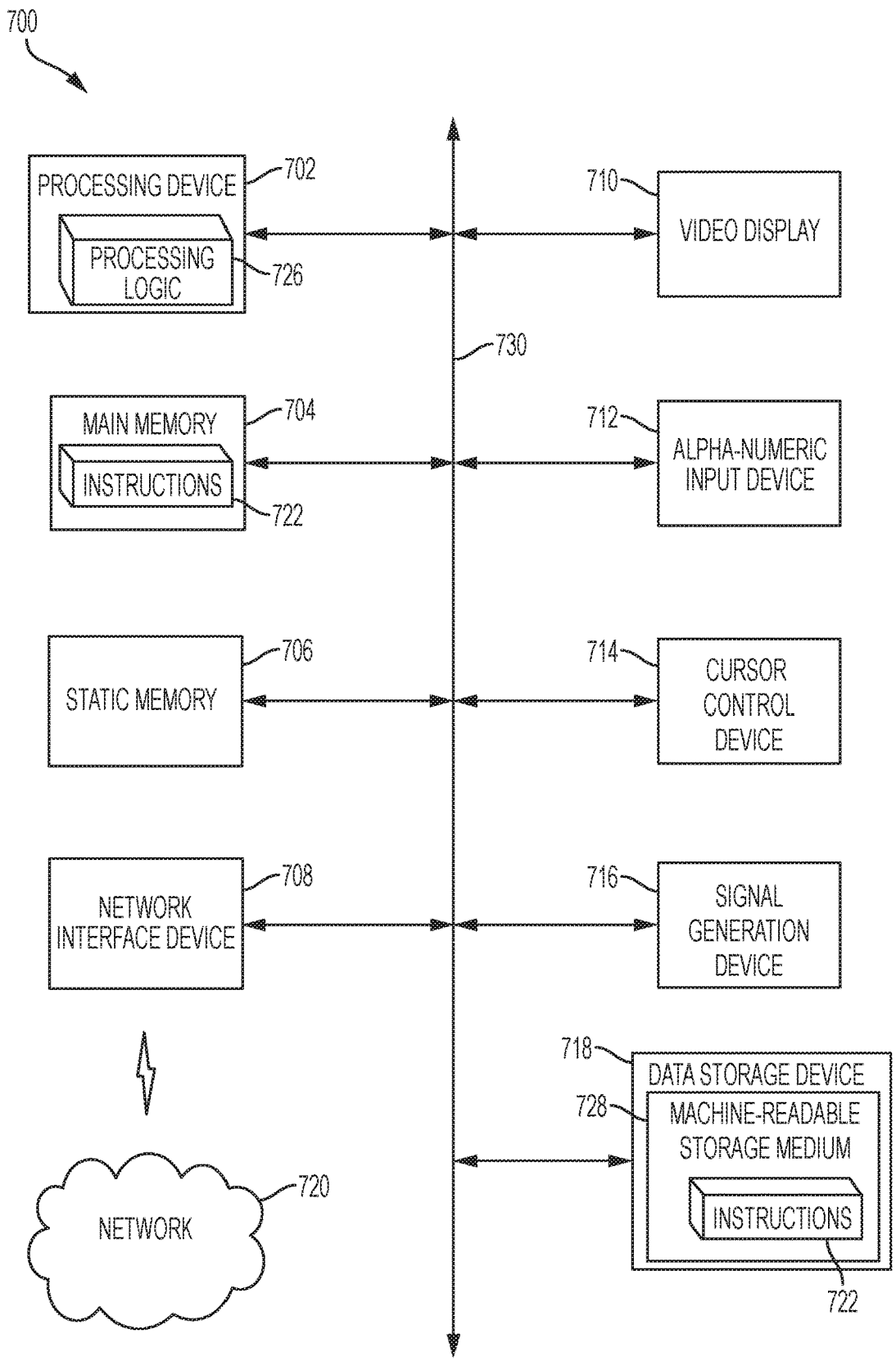
FIG. 8 is a block diagram that illustrates a diagrammatic representation of a machine in the exemplary form of a computer system within which a set of instructions, for causing the machine to perform any one or more of the methodologies discussed herein, may be executed.

FIG. 8 illustrates a diagrammatic representation of a machine in the exemplary form of a computer system 700 within which a set of instructions, for causing the machine to perform any one or more of the methodologies discussed herein, may be executed. The system 700 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 700 may represent a server system 102 as shown in FIG. 1.

The exemplary computer system 700 includes a processing device (processor) 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)), and a data storage device 718, which communicate with each other via a bus 730.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also be one or more special-purpose processing devices such as an application specific integrated circuit (ASIC), a field programmable gate array (FPGA), a digital signal processor (DSP), network processor, or the like.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a computer-readable medium 728 on which is stored one or more sets of instructions 722 (e.g., instructions of in-memory buffer service 74) embodying any one or more of the methodologies or functions described herein. The instructions 722 may also reside, completely or at least partially, within the main memory 704 and/or within processing logic 726 of the processing device 702 during execution thereof by the computer system 700, the main memory 704 and the processing device 702 also constituting computer-readable media. The instructions may further be transmitted or received over a network 720 via the network interface device 708.

While the computer-readable storage medium 728 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method, comprising:
receiving, at a bot engine from an interaction platform, a user message object comprising content of a user message from a user that was communicated from a user system;
processing the user message object, at the bot engine, to generate one or more of a record insert or a query based on the user message object;
communicating the record insert or the query to an application platform of a server system;
processing the record insert or the query at the application platform to generate a user update message based on the record insert or the query;
receiving, at a marketing server system, the user update message from the application platform;
generating, at a content distribution server of the marketing server system, a response message in response to the user update message generated by the application platform based on the record insert or the query from the bot engine, the response message comprising content responsive to the content of the user message; and
receiving, from the user system at the content distribution server, a user reply message from the user that is responsive to the response message, wherein the user reply message from the user includes content pertaining to the user that is responsive to the content of the response message from the content distribution server.

2. The method according to claim 1, the method further comprising:
generating, at the content distribution server, a user information record for a user in response to the user update message; and
storing the user information record at a user information database.

3. The method according to claim 2, the method further comprising:
generating updates to the user information record each time a new user update message is received from the application platform; and
generating updates to the user information record each time a user reply message from the user is received from the user system.

4. The method according to claim 1, the method further comprising:
processing, at the bot engine, the user message object to generate session state information based on the user message object, wherein the session state information comprises information that tracks past interactions between the bot engine and the user and allows the bot engine to understand where the conversation with the user last left off;
storing, at a state logic data store of a state engine, the session state information from the bot engine; and
updating the session state information each time new session state information is provided from the bot engine.

5. The method according to claim 1, the method further comprising:
generating, via a CRM application executed at the application platform of the server system, a new CRM record based on the record insert received from the bot engine;
storing the new CRM record at a CRM database; and wherein generating, at the application platform of the server system, the user update message based on the record insert or the query, comprises:
generating, at the application platform of the server system, the user update message based on the record insert received from the bot engine.

6. The method according to claim 1, the method further comprising:
retrieving, via a CRM application executed at the application platform of the server system, an existing CRM record from a CRM database in response to the query;
communicating the existing CRM record retrieved from the CRM database from the application platform to the bot engine; and
using the existing CRM record at the bot engine to generate a corresponding bot reply object for the user message object, wherein the corresponding bot reply object comprises a response to the user message.

7. The method according to claim 1, wherein the bot engine comprises a bot logic module, the method further comprising:
processing, at a dialog management module of the bot logic module, the user message object received by the bot engine to generate a corresponding bot reply object for the user message object.

8. The method according to claim 7, wherein the bot engine further comprises an artificial intelligence engine that interfaces with the bot logic module, the method further comprising:
processing, at the artificial intelligence engine, the user message object received by the bot engine to generate input information that is provided to the bot logic module; and
wherein processing, at the dialog management module of the bot logic module, the user message object received by the bot engine, comprises:
processing, at the dialog management module of the bot logic module, the user message object received by the bot engine, based on the input information provided from the artificial intelligence engine, to generate the corresponding bot reply object for the user message object.

9. The method according to claim 8, wherein processing, at the artificial intelligence engine, the user message object received by the bot engine to generate input information that is provided to the bot logic module, comprises at least one of:
processing content of the user message object received by the bot engine, at a natural language processing engine of the artificial intelligence engine, to determine context of the user message; generating, based on the context of the user message, at least one appropriate response to that user message; and providing the appropriate response to the bot logic module for use in generating the corresponding bot reply object for the user message object;
processing the content of the user message object received by the bot engine, at an intent analyzer nodule of the artificial intelligence engine, to determine user intent based on the content of that user message object; generating user intent information; and providing the user intent information to the bot logic module for use in generating the corresponding bot reply object for the user message object;
processing the content of the user message object received by the bot engine, at a sentiment analyzer nodule of the artificial intelligence engine, to determine user sentiment based on the content of that user message object; generating user sentiment information; and providing the user sentiment information to the bot logic module for use in generating the corresponding bot reply object for the user message object; and processing any attachment information associated with the user message object received by the bot engine, at a vision engine of the artificial intelligence engine, to determine content of the attachment information associated with that user message object;

generating, supplemental information that is responsive to the attachment information associated with that user message object; and providing the supplemental information to the bot logic module for use in generating the corresponding bot reply object for the user message object.

10. A system, comprising:

a bot engine configurable to: receive a user message object from an interaction platform, the user message object comprising content of a user message from a user that was communicated from a user system to the interaction platform; and process the user message object to generate one or more of a record insert or a query based on the user message object;

a server system comprising: an application platform configurable to process the record insert or the query received from the bot engine to generate a user update message based on the record insert or the query; and a marketing server system configurable to receive the user update message, wherein the marketing server system comprises:

a content distribution server configurable to generate a response message in response to the user update message generated by the application platform based on the record insert or the query from the bot engine, the response message comprising content responsive to the content of the user message from the user message object, and to receive, from the user system, a user reply message from the user, wherein the user reply message includes content pertaining to the user that is responsive to the content of the response message from the content distribution server.

11. The system according to claim 10, wherein the marketing server system further comprises:

a user information database configurable to:

generate and store a user information record for the user in response to the user update message, and update the user information record each time a new user update message is received from the application platform, and each time a user reply message from the user is received from the user system.

12. The system according to claim 10, wherein the bot engine is further configurable to: generate session state information based on the user message object, wherein the session state information comprises information that tracks past interactions between the bot engine and the user and allows the bot engine to understand where the conversation with the user last left off;

the system further comprising:

a state engine configurable to receive the session state information from the bot engine, the state engine comprising a state logic data store configurable to store the session state information and update the session state information each time new session state information is provided from the bot engine.

13. The system according to claim 10, wherein the application platform is configurable to host and execute a CRM application, and further comprising:

a CRM database engine comprising a CRM database that is configurable to store CRM records;

wherein the application platform is configurable to: receive the record insert from the bot engine, wherein the CRM application configurable to: generate, in response to receiving the record insert from the bot engine, a new CRM record based on the record insert; and store the new CRM record at the CRM database, and wherein the application platform is configurable to generate the user update message based on the record insert received from the bot engine.

14. The system according to claim 10, wherein the application platform is configurable to host and execute a CRM application, and wherein the application platform is configurable to: receive the query from the bot engine, and wherein the CRM application is configurable to: retrieve an existing CRM record from the CRM database in response to the query and communicate the existing CRM record to the bot engine, and wherein the bot engine is configurable to use the existing CRM record to generate a corresponding bot reply object for the user message object, wherein the corresponding bot reply object comprises a response to the user message.

15. The system according to claim 10, wherein the application platform is configurable to host and execute a CRM application, and further comprising:

a CRM database engine comprising a CRM database that is configurable to store CRM records;

wherein the application platform is configurable to communicate the existing CRM record retrieved from the CRM database to the bot engine in response to the CRM application retrieving the existing CRM record from the CRM database.

16. The system according to claim 10, wherein the bot engine comprises:

a bot logic module comprising a dialog management module that is configurable to process the user message object received by the bot engine and to generate a corresponding bot reply object for the user message object.

17. The system according to claim 16, wherein the bot engine further comprises:

an artificial intelligence engine that interfaces with the bot logic module, wherein the artificial intelligence engine is configurable to process the user message object received by the bot engine and generate input information that is provided to the bot logic module, and wherein the dialog management module is further configurable to generate a corresponding bot reply object for the user message object based on the input information.

18. The system according to claim 17, wherein the artificial intelligence engine comprises at least one of:

a natural language processing engine that is configurable to: parse content of the user message object, analyze language of the content to determine context of a corresponding user message of the user message object, and determine one or more appropriate response to the corresponding user message for use in generating a corresponding bot reply object for the user message object;

an intent analyzer nodule configurable to: process the content of the user message object to determine user intent based on the user message object, and generate user intent information; and provide the user intent information to the bot logic module for use in generating a corresponding bot reply object for the user message object;

a sentiment analyzer nodule configurable to: process the content of the user message object to determine user sentiment based on that user message object, and generate user sentiment information; and provide the user sentiment information to the bot logic module for use in generating a corresponding bot reply object for the user message object; and a vision engine configurable to: process any attachment information associated with the user message object to determine content of the attachment information associated with that user message object, and generate supplemental information that is responsive to the attachment information associated with that user message object; and provide the supplemental information to the bot logic module for use in generating a corresponding bot reply object for the user message object.

19. A system comprising at least one hardware-based processor and memory, wherein the memory comprises processor-executable instructions encoded on a non-transient processor-readable media, wherein the processor-executable instructions, when executed by the processor, are configurable to cause:

receiving, at a bot engine from an interaction platform, a user message object comprising content of a user message from a user that was communicated from a user system;

processing the user message object, at the bot engine, to generate one or more of a record insert or a query based on the user message object;

communicating the record insert or the query to an application platform of a server system;

processing the record insert or the query at the application platform to generate a user update message based on the record insert or the query;

receiving, at a marketing server system, the user update message from the application platform;

generating, at a content distribution server of the marketing server system, a response message in response to the user update message generated by the application platform based on the record insert or the query from the bot engine, the response message comprising content responsive to the content of the user message; and receiving, from the user system at the content distribution server, a user reply message from the user that is responsive to the response message, wherein the user reply message from the user includes content pertaining to the user that is responsive to the content of the response message from the content distribution server.

20. The system according to claim 19, the method further comprising:

generating, via a CRM application executed at the application platform of the server system, a new CRM record based on the record insert;

storing the new CRM record at a CRM database; and wherein generating, at the application platform of the server system, the user update message based on the record insert or the query, comprises:

generating, at the application platform of the server system, the user update message based on the record insert.

* * * * *